US012046233B2

(12) United States Patent
Chao et al.

(10) Patent No.: US 12,046,233 B2
(45) Date of Patent: Jul. 23, 2024

(54) AUTOMATICALLY DETERMINING LANGUAGE FOR SPEECH RECOGNITION OF SPOKEN UTTERANCE RECEIVED VIA AN AUTOMATED ASSISTANT INTERFACE

(71) Applicant: GOOGLE LLC, Mountain View, CA (US)

(72) Inventors: Pu-sen Chao, Los Altos, CA (US); Diego Melendo Casado, Mountain View, CA (US); Ignacio Lopez Moreno, New York, NY (US); William Zhang, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/361,408

(22) Filed: Jul. 28, 2023

(65) Prior Publication Data
US 2023/0368784 A1 Nov. 16, 2023

Related U.S. Application Data

(63) Continuation of application No. 17/328,400, filed on May 24, 2021, now Pat. No. 11,735,173, which is a (Continued)

(51) Int. Cl.
*G10L 15/22* (2006.01)
*G10L 13/00* (2006.01)
(Continued)

(52) U.S. Cl.
CPC ............ *G10L 15/197* (2013.01); *G10L 13/00* (2013.01); *G10L 15/005* (2013.01); *G10L 15/08* (2013.01);
(Continued)

(58) Field of Classification Search
CPC ....... G10L 15/005; G10L 15/22; G10L 15/01; G10L 15/06; G10L 15/063; G10L 15/065;
(Continued)

(56) References Cited

U.S. PATENT DOCUMENTS 5,515,475 A    5/1996   Gupta et al.
7,873,517 B2   1/2011   Prieto et al.
(Continued)

FOREIGN PATENT DOCUMENTS

CN    201332158      10/2009
CN    101901599 A    12/2010
(Continued)

OTHER PUBLICATIONS

China National Intellectual Property Administration; Notice of Allowance issued for Application No. 201880039581.6, 6 pages, dated Jul. 27, 2023.
(Continued)

*Primary Examiner* — Qi Han
(74) *Attorney, Agent, or Firm* — Gray Ice Higdon

(57) ABSTRACT

Determining a language for speech recognition of a spoken utterance received via an automated assistant interface for interacting with an automated assistant. Implementations can enable multilingual interaction with the automated assistant, without necessitating a user explicitly designate a language to be utilized for each interaction. Implementations determine a user profile that corresponds to audio data that captures a spoken utterance, and utilize language(s), and optionally corresponding probabilities, assigned to the user profile in determining a language for speech recognition of the spoken utterance. Some implementations select only a subset of languages, assigned to the user profile, to utilize in speech recognition of a given spoken utterance of the user. Some implementations perform speech recognition in each
(Continued)

of multiple languages assigned to the user profile, and utilize criteria to select only one of the speech recognitions as appropriate for generating and providing content that is responsive to the spoken utterance.

20 Claims, 7 Drawing Sheets

Related U.S. Application Data continuation of application No. 16/163,327, filed on Oct. 17, 2018, now Pat. No. 11,017,766, which is a continuation-in-part of application No. 15/769,013, filed as application No. PCT/US2018/027808 on Apr. 16, 2018, now Pat. No. 10,839,793.

(51) Int. Cl.
| | |
|---|---|
| *G10L 15/00* | (2013.01) |
| *G10L 15/08* | (2006.01) |
| *G10L 15/14* | (2006.01) |
| *G10L 15/18* | (2013.01) |
| *G10L 15/197* | (2013.01) |
| *G10L 15/30* | (2013.01) |

(52) U.S. Cl.
CPC .......... *G10L 15/14* (2013.01); *G10L 15/1822* (2013.01); *G10L 15/22* (2013.01); *G10L 15/30* (2013.01); *G10L 2015/088* (2013.01); *G10L 2015/223* (2013.01); *G10L 2015/228* (2013.01)

(58) Field of Classification Search
CPC ......... G10L 15/07; G10L 15/10; G10L 15/14; G10L 15/18; G10L 15/183; G10L 15/26; G10L 15/30; G10L 2015/0631–0638; G10L 2015/221–228
USPC ....... 704/257, 231, 236, 240, 243, 250, 251, 704/255, 270.1, 270
See application file for complete search history.

(56) References Cited

U.S. PATENT DOCUMENTS

| | | | |
|---|---|---|---|
| 8,909,528 B2 | 12/2014 | Eide | |
| 8,935,147 B2* | 1/2015 | Stern | G06Q 10/00 |
| | | | 704/8 |
| 9,031,829 B2 | 5/2015 | Leydon et al. | |
| 9,418,567 B1 | 8/2016 | Chen et al. | |
| 9,606,767 B2 | 3/2017 | Corfield | |
| 9,786,271 B1 | 10/2017 | Combs et al. | |
| 9,786,281 B1 | 10/2017 | Adams et al. | |
| 9,953,634 B1 | 4/2018 | Pearce et al. | |
| 9,953,636 B2 | 4/2018 | Cohen et al. | |
| 9,971,759 B2* | 5/2018 | Hobson | G06F 9/454 |
| 10,679,615 B2 | 6/2020 | Chao et al. | |
| 10,839,793 B2 | 11/2020 | Chao et al. | |
| 11,017,766 B2 | 5/2021 | Chao et al. | |
| 11,798,541 B2 | 10/2023 | Chao | |
| 2003/0018475 A1 | 1/2003 | Basu et al. | |
| 2005/0187770 A1 | 8/2005 | Kompe et al. | |
| 2008/0281598 A1 | 11/2008 | Eide | |
| 2011/0055256 A1 | 3/2011 | Phillips et al. | |
| 2012/0323557 A1 | 12/2012 | Koll et al. | |
| 2013/0238336 A1 | 9/2013 | Sung et al. | |
| 2013/0332147 A1 | 12/2013 | Corfield | |
| 2014/0012577 A1 | 1/2014 | Freeman et al. | |
| 2014/0012578 A1 | 1/2014 | Morioka | |
| 2014/0272821 A1 | 9/2014 | Pitschel et al. | |
| 2014/0280051 A1 | 9/2014 | Djugash | |
| 2015/0006147 A1 | 1/2015 | Schmidt | |
| 2015/0120288 A1 | 4/2015 | Thomson et al. | |
| 2015/0142704 A1 | 5/2015 | London | |
| 2015/0302855 A1 | 10/2015 | Kim et al. | |
| 2015/0364129 A1 | 12/2015 | Gonzalez-Dominguez et al. | |
| 2016/0035346 A1 | 2/2016 | Chengalvarayan | |
| 2016/0140218 A1 | 5/2016 | Moreno et al. | |
| 2016/0162469 A1 | 6/2016 | Santos | |
| 2016/0217788 A1 | 7/2016 | Stonehocker et al. | |
| 2016/0217790 A1 | 7/2016 | Sharifi | |
| 2016/0329048 A1 | 11/2016 | Li et al. | |
| 2016/0350285 A1 | 12/2016 | Zhao et al. | |
| 2017/0309271 A1 | 10/2017 | Chiang | |
| 2018/0018959 A1 | 1/2018 | Des Jardins et al. | |
| 2018/0068653 A1 | 3/2018 | Trawick | |
| 2018/0211650 A1 | 7/2018 | Knudson et al. | |
| 2019/0102481 A1 | 4/2019 | Sreedhara | |
| 2019/0318724 A1 | 10/2019 | Chao et al. | |
| 2019/0318729 A1 | 10/2019 | Chao et al. | |
| 2020/0104094 A1 | 4/2020 | White et al. | |

FOREIGN PATENT DOCUMENTS

| | | | |
|---|---|---|---|
| CN | 104282307 | A | 1/2015 |
| CN | 104505091 | A | 4/2015 |
| CN | 104575493 | A | 4/2015 |
| CN | 104978015 | A | 10/2015 |
| CN | 105190607 | A | 12/2015 |
| CN | 105957516 | A | 9/2016 |
| CN | 106710586 | A | 5/2017 |
| CN | 106997762 | A | 8/2017 |
| CN | 107623614 | A | 1/2018 |
| CN | 107895578 | A | 4/2018 |
| WO | 2015112149 | A1 | 7/2015 |
| WO | 2015196063 | A1 | 12/2015 |

OTHER PUBLICATIONS

Intellectual Property India; Hearing Noticed issued in Application No. 201927050873; 3 pages; dated Dec. 19, 2023.
Intellectual Property India; Extended Hearing Noticed issued in Application No. 201927050873; 4 pages; dated Jan. 30, 2024.
European Patent Office; Communication issued in Application No. 23191963.0; 5 pages; dated Nov. 21, 2023.
China National Intellectual Property Administration; Notification of First Office Action issued for Application No. 201880039581.6, 19 pages, dated Mar. 1, 2023.
European Patent Office; Intention to Grant issued in Application No. 20195508.5; 48 pages; dated Mar. 14, 2023.
Intellectual Property Office of Singapore; Notice of Eligibility of Grant issued for Application No. 11201912061W, 4 pages, dated Dec. 13, 2022.
Intellectual Property Office of Singapore; Notice of Eligibility of Grant issued for Application No. 11201912053X, 4 pages, dated Dec. 13, 2022.
China National Intellectual Property Administration; Notification of First Office Action issued for Application No. 201880039579.9, 22 pages, dated Jan. 13, 2023.
Levit, M. et al.; End-to-end speech recognition accuracy metric for voice-search tasks; IEEE International Conference on Acoustics; Speech and Signal Processing (ICASSP); Japan; pp. 5141-5144; dated 2012.
Sun, L. et al.; Generating language distance metrics by language recognition using acoustic features; 8th International Conference on Wireless communications & Signal Processing (WCSP); China; pp. 1-5; dated 2016.
Eueropean Patent Office; Communication issued in Application No. 20195508.5; 11 pages; dated Mar. 11, 2021.
Intellectual Property India; Office Action issued in Application No. 201927050873; 6 pages; dated Mar. 12, 2021.
Eueropean Patent Office; Communication issue in Application No. 20195508.5; 13 pages; dated Dec. 7, 2020.
European Patent Office; Intention to Grant of EP Ser. No. 18722336. 7; 44 pages; dated Dec. 20, 2019.

(56) References Cited

OTHER PUBLICATIONS

European Patent Office; International Search Report and Written Opinion of PCT Ser. No. PCT/US2018/027808; 20 pages dated Nov. 26, 2018.
European Patent Office; Invitation to Pay Additional Fees in International Patent Application No. PCT Ser. No. PCT/US2018/027808; 14 pages; dated Oct. 2, 2018.
Gonzalez-Dominguez, J., et al. "A Real-Time End-to-End Multilingual Speech Recognition Architecture". IEEE Journal of Selected Topics in Signal Processing, vol. 9, No. 4; pp. 749-759; dated Jun. 2015.
European Patent Office; International Search Report and Written Opinion of PCT Ser. No. PCT/US2018/027812; 14 pages; dated Oct. 1, 2018.
European Patent Office; Communication issue in Application No. 20177711.7; 9 pages; dated Aug. 25, 2020.
Gonzalez-Dominguez, J., et al. "A Real-Time End-to-End Multilingual Speech Recognition Architecture". IEEE Journal of Selected Topics in Signal Processing, vol. 9, No. 4; pp. 749-759; Jun. 2015.
European Patent Office; Intention to Grant issue in Application No. 18722334.2; 48 pages; dated Jun. 8, 2020.
Intellectual Property India; Office Action issued in Application No. 201927051483; 6 pages; dated Mar. 18, 2021.
European Patent Office; Communication Pursuant to Article 94(3) EPC issue in Application No. 20177711.7; 5 pages; dated Sep. 28, 2021.
Intellectual Property Office of Singapore; Notice for Eligibility of Grant issued in Application No. 11201912053X; 4 pages; dated Dec. 13, 2022.
China National Intellectual Property Administration; Notice of Allowance issued for Application No. 201880039579.9, 6 pages, dated May 29, 2023.

\* cited by examiner

AUTOMATICALLY DETERMINING LANGUAGE FOR SPEECH RECOGNITION OF SPOKEN UTTERANCE RECEIVED VIA AN AUTOMATED ASSISTANT INTERFACE

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input. An automated assistant responds to a request by providing responsive user interface output, which can include audible and/or visual user interface output.

As mentioned above, an automated assistant can convert audio data, corresponding to a spoken utterance of a user, into corresponding text (or other semantic representation). For example, audio data can be generated based on detection of a spoken utterance of a user via one or more microphones of a client device that includes an assistant interface for enabling the user to interact with an automated assistant. The automated assistant can include a speech recognition engine that attempts to recognize various characteristics of the spoken utterance captured in the audio data, such as the sounds produced (e.g., phonemes) by the spoken utterance, the order of the produced sounds, rhythm of speech, intonation, etc. Further, the speech recognition engine can identify text words or phrases represented by such characteristics. The text can then be further processed by the automated assistant (e.g., using a natural language understanding (NLU) engine and/or a dialog state engine) in determining responsive content for the spoken utterance. The speech recognition engine can be implemented by the client device and/or by one or more automated assistant component(s) that are remote from, but in network communication with, the client device.

However, many speech recognition engines are configured to recognize speech in only a single language. For multilingual users and/or households, such single language speech recognition engines can be unsatisfactory, and can cause an automated assistant to fail and/or provide erroneous output when a spoken utterance is received in an additional language that is not the single language supported by the speech recognition engines. This can render the automated assistant unusable and/or lead to excess usage of computational and/or network resources. Excess usage of computational and/or network resources can be a result of a user needing to provide a further spoken utterance, that is in the single language supported, when the automated assistant fails or provides erroneous output. Such further spoken utterance must additionally be processed by a corresponding client device and/or remote automated assistant component(s), thereby causing additional usage of various resources.

Other speech recognition engines may be configured to recognize speech in multiple languages, but require a user to explicitly designate which of the multiple languages should be utilized in speech recognition at a given time. For example, some of the other speech recognition engines may require a user to manually designate a default language to be utilized in speech recognition of all spoken utterances received at a particular client device. To change the default language to another language, the user can be required to interact with a graphical and/or audible interface to explicitly alter the default language. Such interaction can lead to excess usage of computational and/or network resources in the rendering of the interface, the processing of inputs of the user provided via the interface, etc. Further, it may often be the case that a user forgets to change the default language prior to providing a spoken utterance that is not currently the default language. This can render the automated assistant unusable and/or lead to excess usage of computational and/or network resources as described above.

SUMMARY

Implementations described herein relate to systems, methods, and apparatus for automatically determining a language for speech recognition of a spoken utterance received via an automated assistant interface. In some implementations, speech recognition of a spoken utterance using a given language can include processing audio data, which captures the spoken utterance, using one or more speech recognition models for the given language in order to generate text that corresponds to the spoken utterance, and that is in the given language. As described herein, multiple speech recognition models can be accessible for speech recognition, and each of the speech recognition models can be configured for a corresponding language of multiple languages. For example, a first speech recognition model can be configured for generating English text based on processing audio data including English spoken utterances, a second speech recognition model can be configured for generating French text based on processing audio data including French spoken utterances, a third speech recognition model can be configured for generating Spanish text based on processing audio data including Spanish spoken utterances, etc.

Some implementations described herein can utilize various techniques to select only a subset of languages to utilize in speech recognition of a given spoken utterance of a given user. For example, the given user can have a user profile with multiple candidate languages assigned to the user profile. The multiple candidate languages can be manually assigned to the user profile by the user and/or automatically assigned based on past usage of the candidate language(s) by the user across one or more platforms. As described in more detail below, selecting only the subset of languages can be based on, for example, probability metrics assigned to the multiple candidate languages for the user profile, which can be based on past usage of the multiple candidate languages for the user profile, and which can each correspond to one or more contextual parameters (e.g., each based on past usage of a corresponding language for the user profile, given the contextual parameter(s)).

As one particular example, a single particular language, of multiple languages assigned to the user profile, can have an assigned probability metric, for one or more current contextual parameters (e.g., a client device via which the given spoken utterance is detected, a time of day, and/or a day of the week), wherein the probability metric indicates a very high likelihood of the single particular language being spoken by the given user. Based on the assigned probability metric, the single particular language can be selected, and speech recognition can be performed using only speech recognition model(s) for the single language. Performing the speech recognition can result in corresponding text, in the single language, that can then be further processed by additional component(s) of an automated assistant in generating content that is responsive to the given spoken utterance. The content that is responsive can then be provided for rendering at the client device for presentation to the user. The content that is responsive can optionally be in the same single language, or provided to cause rendering in the same single language.

As another particular example, two particular languages, of three or more candidate languages assigned to the user profile, can have corresponding assigned probability metrics, for one or more current contextual parameters, where the probability metrics each indicate at least a threshold likelihood of a corresponding one of the two particular languages being spoken by the given user. Based on the assigned probability metrics, the two particular languages can be selected, and speech recognition of the given spoken utterance performed using only speech recognition models for the two particular languages. The other candidate language(s) may not be selected for speech recognition based on their corresponding assigned probability metrics, for the one or more current contextual parameters, failing to satisfy a threshold.

Performing the speech recognition using the speech recognition model for a first of the two particular languages can result in corresponding first text, in the first language, and optionally a first measure that indicates a likelihood that the first text is representative of the given spoken utterance. Performing the speech recognition using the speech recognition model for a second of the two particular languages can result in corresponding second text, in the second language, and optionally a second measure that indicates a likelihood that the second text is representative of the given spoken utterance. One of the first text or the second text can then be selected as appropriate text for generating and providing content that is responsive to the given spoken utterance.

In some implementations, one of the first text or the second text is selected based on the first and second measures that indicate corresponding likelihoods that they are representative of the given spoken utterance. For example, if the first measure indicates an 80% likelihood the first text is representative of the given spoken utterance, and the second measure indicates a 70% likelihood the second text is representative of the given spoken utterance, the first text can be selected in lieu of the second text in view of the first measure indicating a greater likelihood than the second measure. In some of those implementations, the probability metrics for the two particular languages can further be considered. For example, assume again that the first measure indicates an 80% likelihood and the second measure indicates a 70% likelihood, and further assume that the probability metric for the first language (for the one or more contextual parameters) is 30% and the probability metric for the second language (for the one or more contextual parameters) is 65%. In such an example, the second text can be selected in lieu of the first based on consideration of both the measures that indicate the likelihoods that the first and second texts are representative of the given spoken utterance, and the probability metrics for the first and second languages. For instance, a score for the first text can be based on 70% and 65% (e.g., a score of 0.455 based on 0.7*0.65) and a score for the second text can be based on 80% and 30% (e.g., a score of 0.24 based on 0.8*0.3), and the first text selected based on having the higher score.

These and other implementations that select only a subset of candidate languages of a user to utilize in speech recognition of a spoken utterance of the user can conserve various resources of device(s) (e.g., client device(s) and/or remote automated assistant component(s)) that perform the speech recognition), as only speech recognition model(s) that correspond to the subset of languages are utilized in performing the speech recognition. Further, these and other implementations that utilize probability metrics for languages and/or measures for generated text can increase the likelihood that an automated assistant generates responsive content based on the appropriate text. This can lead to an improved automated assistant, and can also conserve various resources as it mitigates risk of the automated assistant providing errant responsive content based on recognition of text using a language that is not the language being spoken in a spoken utterance. Such mitigation of risk of errant responsive content prevents further resource intensive detection of further user interface input (and processing of that input) in attempting to rectify the errant responsive content.

Some implementations described herein can additionally or alternatively utilize various techniques to perform speech recognition, of a given spoken utterance of a given user, in each of multiple languages assigned to a user profile of the given user. In those implementations, probability metrics (optionally dependent on current contextual parameter(s)) for the multiple languages and/or measures for each of the speech recognitions can still be utilized to select only one of the speech recognitions as appropriate for generating and providing content that is responsive to the given spoken utterance. As one particular example, assume the given user has only a first language and a second language assigned in a user profile of the given user. Further assume the first language has a probability metric of 60% and the second language has a probability metric of 40%. Speech recognition of the given spoken utterance can be performed using a first speech recognition model for the first language to generate first text in the first language, and a measure that indicates a 70% likelihood the first text is representative of the given spoken utterance. Speech recognition of the given spoken utterance can also be performed using a second speech recognition model for the second language to generate second text in the second language, and a measure that indicates a 70% likelihood the second text is representative of the given spoken utterance. One of the first text or the second text can then be selected as appropriate text for generating and providing content that is responsive to the given spoken utterance. For example, the first text can be selected in lieu of the second text based on the first language probability metric (60%) being higher than the second language probability metric (40%), and based on the first and second text measures being the same (70%).

These and other implementations that utilize probability metrics for languages and/or measures for generated text can increase the likelihood that an automated assistant generates responsive content based on the appropriate text. This can lead to an improved automated assistant, and can also conserve various resources as it mitigates risk of the automated assistant providing errant responsive content based on recognition of text using a language that is not the language being spoken in a spoken utterance. Such mitigation of risk of errant responsive content prevents further resource intensive detection of further user interface input (and processing of that input) in attempting to rectify the errant responsive content.

As mentioned above, a user profile of a user providing a spoken utterance can be determined, and the user profile utilized to identify language(s) assigned to the user profile and/or probability metric(s) for the language(s), for use in various implementations described herein. In some implementations, the user profile is determined based on determining that at least a portion of audio data, that captures the spoken utterance, has one or more features (e.g., intonation, pitch, tone, accents, intonation, and/or any other feature) that correspond to feature(s) assigned to the user profile. For example, the audio data can be processed, using one or more acoustic models, to determine features of the audio data, and those feature(s) compared to feature(s) of candidate user profile(s) (e.g., candidate user profile(s) associated with a client device via which the audio data is received), and one of the candidate user profile(s) determined as the user profile for the audio data based on the comparison indicating a sufficient match.

In some of those implementations, the portion of the audio data that is determined to have feature(s) corresponding to feature(s) mapped to the user profile, is a portion that corresponds to an invocation phrase configured to invoke an automated assistant. An invocation phrase for an automated assistant contains one or more hot words/trigger words and can be, for example, "Hey Assistant", "OK Assistant", and/or "Assistant". Often, a client device that includes an assistant interface includes one or more locally stored acoustic models that the client device utilizes to monitor for an occurrence of a spoken invocation phrase. Such a client device can locally process received audio data utilizing the locally stored model, and discards any audio data that does not include the spoken invocation phrase. However, when local processing of received audio data indicates an occurrence of a spoken invocation phrase, the client device will then cause that audio data and/or following audio data to be further processed by the automated assistant.

For example, when the local processing indicates the occurrence of the invocation phrase, further processing can occur to determine a user profile and/or further processing can occur to perform speech recognition according to implementations described herein. For instance, in some implementations, when local processing of a portion of audio data utilizing a locally stored acoustic model indicates the occurrence of a spoken invocation phrase in the portion, output from the locally stored acoustic model can indicate feature(s) of the portion of audio data, and those feature(s) can be compared to feature(s) of candidate user profiles to determine a user profile that corresponds to the spoken invocation phrase (and resultantly, to the portion of the audio data that follows the spoken invocation phrase). Also, for instance, when local processing utilizing a locally stored acoustic model indicates the occurrence of a spoken invocation phrase in a portion of audio data, an additional acoustic model (local or remote) can optionally be utilized to process at least the portion of audio data, determine features of the at least the portion of the audio data, and determine a user profile that corresponds to those feature(s). In some implementations, additional or alternative techniques can be utilized to determine a user profile of a user providing a spoken utterance, such as techniques that use output from a camera of a client device to determine a user profile of a user providing a spoken utterance detected at the client device.

As mentioned above, a user profile can be created for a particular user of a device or application in order to, inter alia, characterize language preferences of the user. Users can be provided control over their user profiles, and a user can control whether any user profile is created for the user. A user profile for a user can identify multiple different languages that the user can use when engaging with the device or application. In some implementations, the user profile can be manually created or modified by the user in order that the user can manually designate preferred languages with which the user can engage with the automated assistant. For example, the user can provide an explicit natural language input such as, "My name is Chris and I speak English," in order to cause the automated assistant to set the English language in the user profile as a most probable language for the user to speak in when communicating with the automated assistant. As another example, the user can provide an explicit natural language input such as, "I speak English and Spanish" in order to cause the automated assistant to set both the English language and the Spanish language as candidate languages for the user in his/her user profile. Additionally or alternatively, one or more candidate languages assigned to a user profile for a user can be based on information that is associated with the user and accessible to the automated assistant such as, for example, emails, contact names, images that include text, location data, etc. For example, the user profile of a user can include candidate languages based on past interactions of the user with the automated assistant (and/or other platforms) using those candidate languages. Further, the user profile of a user can optionally have one or more corresponding probabilities assigned to each of the candidate languages. The one or more probabilities for a language, for the user profile of the user, can be based on past usage of that language by the user for past interactions with an automated assistant and/or past interactions with other platforms (e.g., email platforms, messaging platforms, and/or search platforms).

In some implementations, each language identified by a user profile can be associated with a probability that can depend on a context in which a user is interacting with the automated assistant. For instance, the user profile can identify a probability that a particular language will be employed by a user when a user is providing an invocation phrase for initializing the automated assistant to perform a particular action. Alternatively, or additionally, the probability associated with a particular language can be dynamic, and change during a dialogue sessions between a user and an automated assistant. Each of the languages can correspond to one or more speech recognition models, for converting an audio input that embodies a particular language, to text and/or other semantic representations that characterize the input. When selecting the language or user profile that will be used to interpret inputs from a user, the automated assistant can select speech recognition model(s) that are appropriate for a particular interaction.

The process for determining the language model(s) to use for a particular interaction can include operations such as: processing a stream of audio data using one or more language models to monitor for an occurrence of an invocation phrase for invoking an automated assistant. The operations can further include detecting, based on the processing, an occurrence of the invocation phrase in a portion of the audio data. Based on the processing, or any additional processing using one or more additional language models, a determination can be made as to whether the audio data includes an invocation phrase that corresponds to a stored user profile. When the audio data includes an invocation phrase that corresponds to a stored user profile, a language assigned to the user profile can be identified. Based on the identified language and/or a portion(s) of the audio data, a language model can be selected. Using the selected language model, additional portions of the audio data can be processed and responsive content can be provided back to the user based on the processing of the additional portions of the audio data.

In some implementations, when a user profile is associated with multiple different languages, and each language is associated with a probability the respective language will be employed during an interaction, the probability for each language can be dynamic. For example, a user profile can initially indicate that a first language has a probability of A (e.g., 70%) and a second language has a probability of B (e.g., 30%) before starting a dialogue session between the user and an automated assistant. During the interaction, the automated assistant can detect that a first query is in the second language. In response, the automated assistant can cause one or more probabilities stored in association with the user profile to be modified. For instance, during at least the remainder of the dialog, the user profile can indicate that the probability for the first language is reduced (e.g., 5%) and the probability for the second language can be increased (e.g., 95%).

Multiple user profiles can be managed by an automated assistant that is accessible through a computing device that is interacted with by multiple different users. In this way, a language model selected by the automated assistant can be based on a user profile that is selected according to the user that is interacting with the automated assistant. The automated assistant can identify the user profile and one or more language(s) that are indicated in the user profile as having at least a threshold likelihood of use by the user, at least in the instant context. In some implementations, a user can be associated with multiple user profiles that are associated with different devices, or a single user profile that identifies languages that are preferred for particular devices. For example, a user can prefer to speak a particular language in their vehicle when communicating with an in-vehicle automated assistant, but prefer to speak a different language in their house where other persons who also speak the different language are present. Therefore, the user profile can identify multiple devices and language(s) and corresponding probabilities for each device of the identified multiple devices.

In some implementations, a language selected for a particular user can be based on application data available to the automated assistant. Such application data can correspond to applications that are loaded onto devices through which the user interacts with the automated assistant. For example, a computing device that includes an automated assistant interface can also host an email application that includes emails written in a particular language. The automated assistant can acknowledge the particular language (e.g., French) and confirm that the user would prefer to interact with the automated assistant using that particular language when operating the computing device, the application, and/or any other device or module that can be associated with the automated assistant. For example, the automated assistant can specifically prompt the user with a question such as, "I noticed used you understand French, would you like to interact using French?" Depending on the response, the automated assistant can modify the user profile to indicate the preference of the user to interact using a particular language for a device or application.

In some additional or alternative implementations described herein, a speech recognition model (or other language model) can be preemptively loaded at a client device prior to a user invoking the automated assistant. For example, a language model can be preemptively loaded at a client device based on location data, message data (e.g., an email that includes travel plans), contact data, calendar data, and/or any other data that can be used to infer that the user would prefer a particular language during an upcoming event or context. Furthermore, in some additional or alternative implementations, a language model can be selected based on background noise captured in audio data, which can be used to infer a language with which the user may prefer to speak in a particular context. For instance, the user can explicitly request that the automated assistant translate a particular portion of content (e.g., text that the user will be reading out loud, audio that the user is listening to, etc.). The audio data corresponding to the request can include background noise, therefore the automated assistant can process the audio data to determine that the user is requesting a translation, and also determine the language in which the user would like the final translation to be in.

In some implementations, a number of languages identified by a user profile can change according to an interest of the user in other languages. For instance, a user profile can identify a default language for the user, but as the user further interacts with the automated assistant, the automated assistant can identify additional languages with which to engage with the user. As a result, the automated assistant can push additional language packages to a device of the user, in order that a language model operating on the device can properly convert voice-to-text when the user is communicating with the automated assistant. In some implementations, a language package can be pushed to a device in anticipation of the user interacting with the automated assistant at a particular time in the future. For instance, a user can create a calendar event corresponding to a time in the future, and a title for the calendar event be written in a different language than a default language of the user profile. When the calendar event approaches (e.g., a day before the calendar event), the automated assistant can cause a language package corresponding to the different language to be pushed to the device at which the user created the calendar event. Alternatively, when the calendar event identifies a location, and the automated assistant is aware of a particular computing device that the user typically uses at that location, the automated assistant can cause the language package to be pushed to that particular computing device. In this way, network bandwidth can be optimized by pushing language packages at a time when the user is on a faster or more accessible network, rather than when the user is traveling or otherwise not within a predictably reliable network.

Some implementations described herein relate to systems, methods, and apparatuses for selecting a responsive language for an automated assistant from multiple different languages based on user activities that indicate a preference of the user for a particular language. A list of preferred languages can be identified in a user language profile accessible to the automated assistant, and the list can be modified to identify other languages based on user activity. User activity, such as playing music or reading websites in a particular language, can cause that particular language to be considered by the automated assistant for use when interpreting, understanding, and/or responding to a spoken utterance from the user. In this way, that particular language can be selected over a default language of an assistant device the user is speaking to, in order to ensure that the spoken utterance from the user is processed by the automated assistant according to a user-preferred language.

In some implementations, a user-specific language profile can be selected based on a voice characteristic of a user that provided a spoken utterance. The user-specific language profile can identify one or more language models with which to process audio data corresponding to the spoken utterance. If data that characterizes user activity indicates that the user has been interacting with an application and/or a computing device in a language identified, or not identified, by the user-specific language profile, the user-specific language profile can be modified accordingly and/or without any need for any direct intervention by the user. For instance, if the user-specific language profile does not identify a particular language that the user has been employing to interact with an application, the user-specific language profile can be modified to reference that particular language and/or that particular language's corresponding language model. In this way, the user-specific language profile can be adapted over time, without necessarily requiring the user to explicitly changing certain language settings for their applications and/or devices.

In some implementations, data that characterizes user activity can be based on activities performed by the user at different devices and/or different applications. In this way, a list of languages preferred by a user can be adapted according to data that is not limited to default preferences, but rather user activities that can indicate user language preferences from a variety of different sources. In some implementations, speech that is converted to text according to a language that is selected based on user activities can also be employed for purposes beyond providing a response from an automated assistant. For instance, the text that is converted from user speech can be placed in a search field of a website, a text field of an application, a document to be stored and/or transmitted, and/or otherwise combined with any other data that can be accessible to a computing device.

The above description is provided as an overview of some implementations of the present disclosure. Further description of those implementations, and other implementations, are described in more detail below.

In some implementations, a method implemented by one or more processors is set forth as including operations such as processing audio data using one or more acoustic models to monitor for an occurrence of an invocation phrase configured to invoke an automated assistant. The audio data can be based on detection of spoken input of a user at a client device that includes an automated assistant interface for interacting with the automated assistant. The method can further include detecting, based on processing the audio data using the one or more acoustic models, the occurrence of the invocation phrase in a portion of the audio data, and determining, based on processing of the audio data using the one or more acoustic models or other processing of the audio data using one or more other acoustic models, that the portion of the audio data that includes the invocation phrase corresponds to a user profile that is accessible to the automated assistant. The method can further include identifying a language assigned to the user profile, and selecting a speech recognition model for the language. The speech recognition model for the language can be based on determining the portion of the audio data corresponds to the user profile, and is based on identifying the language as assigned to the user profile. The method can also include using the selected speech recognition model to process a subsequent portion of the audio data that follows the portion of the audio data, and causing the automated assistant to provide responsive content that is determined based on the processing of the subsequent portion using the selected speech recognition model.

In some implementations, the method can further include identifying an additional language assigned to the user profile. Furthermore, selecting the speech recognition model can include selecting the speech recognition model in lieu of an additional speech recognition model for the additional language.

In some implementations, selecting the speech recognition model in lieu of the additional speech recognition model for the additional language can include identifying one or more contextual parameters associated with the audio data, and selecting the speech recognition model based on the one or more contextual parameters being more strongly associated, in the user profile, with the language than with the additional language. The one or more contextual parameters can include an identifier of the client device. The one or more contextual parameters can include one or multiple of: a time of day, a day of the week, and a location of the client device.

In some implementations, selecting the speech recognition model for the language can include selecting the speech recognition model based on at least one probability assigned to the language in the user profile, wherein the at least one probability is based on previous interactions, with the automated assistant, that are associated with the user profile.

In some implementations, the at least one probability is associated with one or more contextual parameters, and the method can further include identifying that the one or more contextual parameters are associated with the audio data, and using the at least one probability in the selecting based on the at least one probability being associated with the one or more contextual parameters identified as associated with the audio data.

In some implementations, using the selected speech recognition model to process the subsequent portion of the audio data that follows the portion of audio data can include using the selected speech recognition model in generating text, in the language, that corresponds to the subsequent portion. Furthermore, causing the automated assistant to provide responsive content that is determined based on the processing of the subsequent portion using the selected speech recognition model can include: generating the responsive content based on the text, and causing the automated assistant interface to render output that is based on the responsive content.

In some implementations, the automated assistant can be configured to access multiple different user profiles that are: available at the client device, and associated with multiple different users of the client device. In some implementations, the multiple different user profiles can each identify one or more corresponding languages and a corresponding language probability for each of the corresponding languages. Furthermore, the corresponding language probabilities can each be based on previous interactions between a corresponding one of the multiple different users and the automated assistant.

In some implementations, using the selected speech recognition model to process the subsequent portion of the audio data can include using the selected speech recognition model to generate first text in the language. Furthermore, the method can include identifying an additional language assigned to the user profile, and selecting an additional speech recognition model for the additional language. Selecting the additional speech recognition model for the additional language can be based on determining the portion of the audio data corresponds to the user profile, and can be based on identifying the additional language as assigned to the user profile. Furthermore, the method can include using the selected additional speech recognition model to process the subsequent portion of the audio data that follows the portion of the audio data. Using the selected additional speech recognition model to process the subsequent portion of the audio data can include using the selected speech recognition model to generate second text in the additional language, and selecting the first text in the language, in lieu of the second text in the additional language. Furthermore, causing the automated assistant to provide responsive content that is determined based on the processing of the subsequent portion using the selected speech recognition model can include: causing, based on selecting the first text in the first language, the automated assistant to provide responsive content that is determined based on the first text in the language.

In yet other implementations, a method implemented by one or more processors is set forth as including operations such as processing audio data. The audio data can be based on detection of spoken input of a user at a client device, and the client device can include an automated assistant interface for interacting with the automated assistant. The method can further include determining, based on processing of the audio data, that at least a portion of the audio data matches a user profile accessible to the automated assistant, and identifying at least one probabilistic metric assigned to the user profile and corresponding to a particular speech recognition model, for a particular language. The method can also include, based on the at least one probabilistic metric satisfying a threshold: selecting the particular speech recognition model, for the particular language, for processing the audio data, and processing the audio data, using the particular speech recognition model for to the particular language, to generate text, in the particular language, that corresponds to the spoken input. The method can further include causing the automated assistant to provide responsive content that is determined based on the generated text.

In some implementations, the user profile further includes an additional probabilistic metric corresponding to at least one different speech recognition model, for a different language. Furthermore, the method can include, based on the additional probabilistic metric failing to satisfy the threshold, refraining from processing the audio data using the different speech recognition model.

In some implementations, the method can include identifying current contextual data associated with the audio data. Identifying the at least one probabilistic metric can be based on a correspondence between the current contextual data and the at least one probabilistic metric. In some implementations, the current contextual data can identify a location of the client device or an application that is being accessed via the client device when the spoken input is received. In some implementations, the current contextual data identifies the client device. In some implementations, the probabilistic metric can be based on past interactions between the user and the automated assistant.

In yet other implementations, a method implemented by one or more processors is set forth as including operations that include receiving audio data. The audio data can be based on detection of spoken input of a user at a client device, the client device including an automated assistant interface for interacting with an automated assistant. The method can also determining that the audio data corresponds to a user profile accessible to the automated assistant, and identifying a first language assigned to the user profile, and a first probability metric assigned to the first language in the user profile. The method can further include selecting a first speech recognition model for the first language. Selecting the first speech recognition model for the first language can be based on identifying the first language as assigned to the user profile. The method can also include using the selected first speech recognition model to generate first text in the first language, and a first measure that indicates a likelihood the first text is an appropriate representation of the spoken input. The method can further include identifying a second language assigned to the user profile, and a second probability metric assigned to the second language in the user profile. Additionally, the method can include selecting a second speech recognition model for the second language. Selecting the second speech recognition model for the second language can be based on identifying the second language as assigned to the user profile. The method can also include using the selected second speech recognition model to generate second text in the second language, and a second measure that indicates a likelihood the second text is an appropriate representation of the spoken input. The method can further include selecting the first text in the first language in lieu of the second text in the second language. Selecting the first text in the first language in lieu of the second text in the second language can be based on: the first probability metric, the first measure, the second probability metric, and the second measure. Furthermore, the method can include, in response to selecting the first text, causing the automated assistant to provide responsive content that is determined based on the selected first text.

In some implementations, the method can include identifying a current context associated with the audio data. Identifying the first probability metric can be based on the first probability metric corresponding to the current context. Identifying the second probability metric can be based on the second probability metric corresponding to the current context. In some implementations, determining that the audio data corresponds to the user profile can be based on comparing features of the audio data to features of the user profile.

In some implementations, a method implemented by one or more processors is set forth as including operations such as determining that a spoken utterance was received at an automated assistant interface of a computing device that is accessible to an automated assistant, wherein the spoken utterance is provided in a first language and the automated assistant is configured to provide a responsive output according to a language selected from at least the first language and a second language. The method can further include selecting, in response to determining that the spoken utterance was received at the automated assistant interface, a user-specific language profile corresponding to a user that provided the spoken utterance, wherein the user-specific language profile identifies at least the second language as a candidate language for providing the responsive output. The method can further include accessing data that characterizes user activity associated with interactions between the user and one or more applications prior to the user providing the spoken utterance, wherein the data indicates that the user has interacted with the one or more applications using the first language. The method can further include selecting, based on the data that characterizes the user activity, the first language over the second language for providing the responsive output; causing, based on the first language being selected over the second language, responsive audio data to be generated, wherein the responsive audio data characterizes the responsive output as expressed using the first language; and causing, when the responsive audio data has been at least partially generated, the responsive output to be provided, at the computing device via the automated assistant, using the responsive audio data.

In some implementations, selecting the user-specific language profile is based on audio data that embodies at least a portion of the spoken utterance and a voice characteristic exhibited by the user when the user provided the portion of the spoken utterance. In some implementations the automated assistant is configured to select the first language as a default language when user activity data is not accessible to the automated assistant or does not indicate that the user has interacted with the one or more applications using the second language. In some implementations, the method can further include modifying, based on the data that characterizes the user activity, the user-specific language profile to indicate that the first language is another candidate for providing subsequent responsive content via the automated assistant. In some implementations the data further indicates that the user has interacted with the one or more applications using both the first language and the second language. In some implementations the data further indicates that the user has provided an input to an application of the one or more applications using the second language and engaged with content, which was provided by the application in the first language. In some implementations, the method can further include causing, at least based on the data that characterizes the user activity, the computing device to receive a language model, corresponding to the first language, for processing at least a portion of subsequent spoken utterances provided in the first language. In some implementations, the user-specific language profile identifying at least the second language is based on a setting, of the automated assistant, that was explicitly set by the user before the spoken utterance was received at the automated assistant interface.

In other implementations, a method implemented by one or more processors is set forth as including operations such as determining that a spoken utterance was received by a computing device from a user, the computing device comprising an automated assistant that is capable of being invoked in response to the user providing the spoken utterance. The method can further include causing audio data, which is based on the spoken utterance, to be processed, by at least a first language model and a second language model, wherein the first language model and the second language model are selected according to a user-specific preference of language models for interpreting spoken utterances from the user. The method can further include determining, based on processing of the audio data, a first score that characterizes a probability that the spoken utterance was provided in a first language and a second score that characterizes another probability that the spoken utterance was provided in a second language. The method can further include determining, based on a user-specific language profile that is accessible to the automated assistant, that the user has intentionally accessed digital content provided in the first language. The method can further include determining, based on determining that the user has intentionally accessed the digital content provided in the first language, another first score to reflect an increase in the probability that the spoken utterance was provided in the first language. The method can further include causing, based on the other first score and the second score, additional audio data to be processed according to a language selected from at least the first language and the second language.

In some implementations, determining that the user has intentionally accessed digital content provided in the first language includes determining that the user provided an input in the second language to an application, and that the user made a selection of the digital content, which was provided in the first language. In some implementations causing additional audio to be processed according to the language selected from at least the first language and the second language includes determining, based on the first score and the second score, a priority of at least one language of the first language and the second language for use when the automated assistant is generating a responsive output for the user. In some implementations, the method can further include causing the additional audio data to be processed according to the language and converted into textual data; and causing the textual data to be input to a text field of a separate application that is different than an application at which the user accessed the digital content. In some implementations, the other score is at least partially dependent upon whether the user made a selection of at least one particular content item of different content items that include the digital content provided in the first language and different digital content provided in the second language. In some implementations, the method can further include determining, based on the audio data corresponding to the spoken utterance, a voice characteristic associated with the user and captured by the audio data, wherein the user-specific preference of language models is identified based on the voice characteristic.

In yet other implementations, a method implemented by one or more processors is set forth as including operations such as determining that a user has interacted with one or more applications when the one or more applications were providing natural language content in a first language, wherein the first language is different from a second language that is a user-specific speech processing language for an automated assistant that is accessible via a computing device. The method can further include causing, based on determining that the user has interacted with the one or more applications, a user-specific language profile, corresponding to the user, to be modified to reference the first language. The method can receiving, subsequent to the user-specific language profile being modified to reference the first language, audio data corresponding to a spoken utterance that was at least partially received at an automated assistant interface of the computing device. The method can further include causing, based on the first language being included in the user-specific language profile and the second language being the user-specific speech processing language, the audio data to be processed by a first language model corresponding to the first language and a second language model corresponding to the second language. The method can further include receiving, based on the first language model and the second language model processing the audio data, a first score and a second score, wherein the first score characterizes a probability that the spoken utterance was provided by the user in the first language and the second score characterizes another probability that the spoken utterance was provided by the user in the second language. The method can further include selecting, based on at least the first score and the second score, a candidate language, from at least the first language and the second language, for use when processing additional audio data corresponding to the spoken utterance. The method can further include causing, based on selecting the candidate language, the additional audio data corresponding to the spoken utterance to be processed using a particular language model that corresponds to the candidate language.

In some implementations, selecting the candidate language is further based on whether the user engaged with natural language content by directly selecting the natural language content. In some implementations, when application data accessible to the automated assistant indicates that the user has previously selected other natural language content provided in the second language, the second language is selected as the candidate language over the first language. In some implementations, the method can further include causing, based on the spoken utterance being processed using the particular language model, responsive data to be provided to the computing device, wherein the responsive data embodies the candidate language and is configured to be used, by the computing device, to provide an audible output for the user. In some implementations, determining the user-specific language profile corresponding to the user includes identifying voice characteristics embodied by the auto data and associated with the user. In some implementations, selecting a candidate language, from at least the first language and the second language, includes determining, for each language of the first language and the second language, a score that characterizes a similarity between each language and the spoken utterance.

Aspects of the present disclosure may advantageously reduce incidents during which a spoken language utterance is not interpreted by an appropriate speech recognition model. Consequently, an improved response to user input may be received, reducing occasions on which an automatic assistant is unresponsive or does not operate as intended. As well as improving functionality for a user, this may reduce load on computer and/or network resources used to implement such an assistant by reducing repeat commands in order to reach a desired result.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
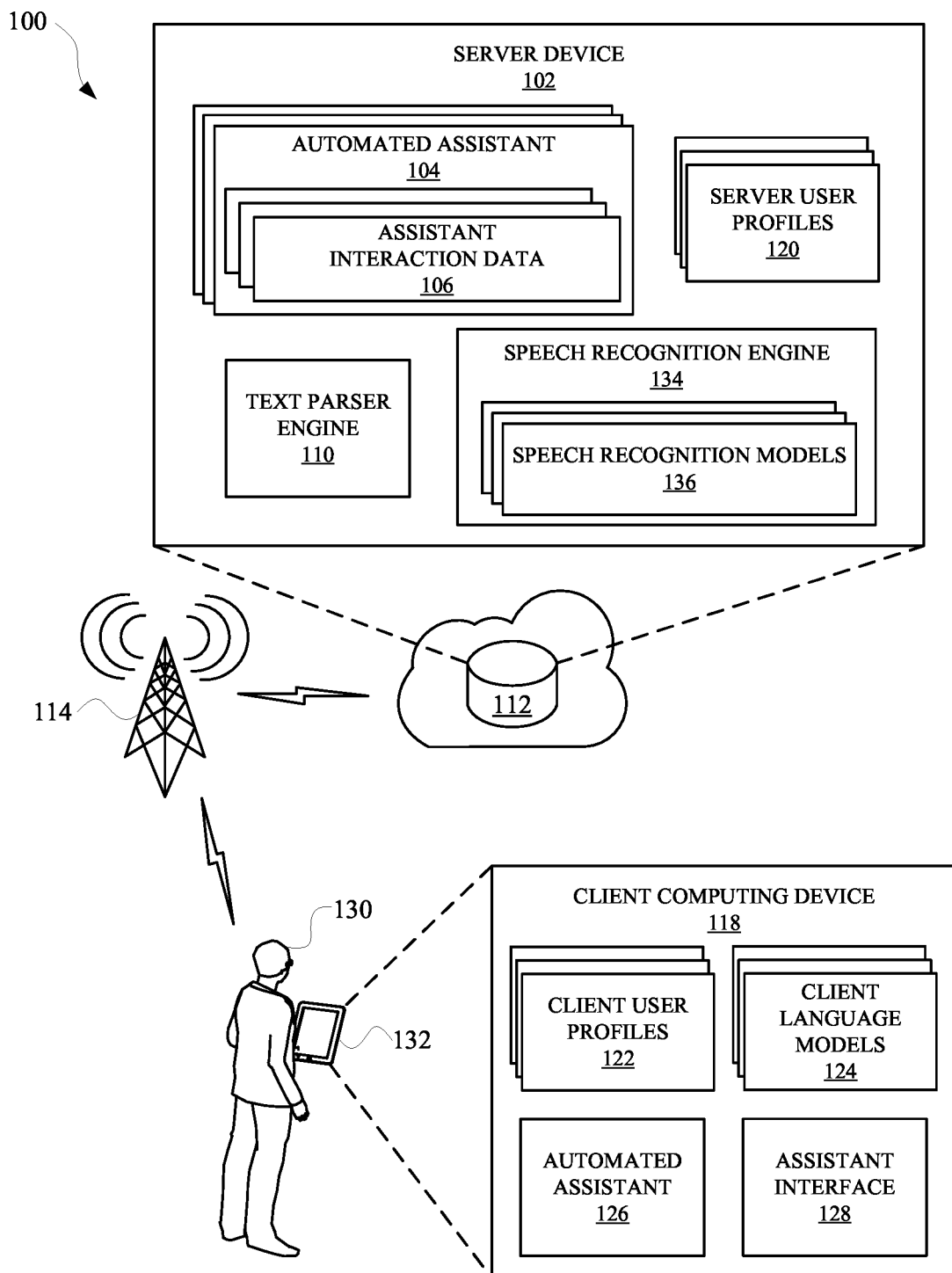
FIG. 1 illustrates a system for selecting a language for an automated assistant to interact with a user.

FIG. 1 illustrates a system 100 for selecting a language for an automated assistant 104 to interact with a user 130. The automated assistant 104 can operate, in part via an automated assistant 126 that is provided at one or more client devices, such as client computing device 118 (e.g., a portable computing device 132), and in part via one or more remote computing device(s) 112, such as a server device 102. The user 130 can interact with the automated assistant 104 via an assistant interface 128 of the client computing device 118. The assistant interface 128 includes user interface input device(s) and user interface output device(s) for use by the automated assistant 126 in interfacing with a user. The assistant interface 128 accepts user interface inputs of the user 130 that are directed to the automated assistant 104, and renders content from the automated assistant 104 for presentation to the user 130. The assistant interface 128 can include, a microphone, a camera, a touch screen display, and/or any other user interface input device(s) of the client computing device 118. The assistant interface 128 can also include a display, projector, a speaker, and/or any other user interface output device(s) of the client computing device 118 that can be used to render content from the automated assistant 104. A user can initialize the automated assistant 104 by providing a verbal, textual, or a graphical input to the assistant interface 128 to cause the automated assistant 104 to perform a function (e.g., provide data, control a peripheral device, access an agent, etc.). The client computing device 118 can include a display device, which can be a display panel that includes a touch interface for receiving touch inputs and/or gestures for allowing a user to control applications of the client computing device 118 via the touch interface. In some implementations, client computing device 118 can lack a display device, thereby providing an audible user interface output, without providing a graphical user interface output. Furthermore, the client computing device 118 can provide a user interface input device, such as a microphone, for receiving spoken natural language inputs from the user 130 (and from additional unillustrated users).

The client computing device 118 can be in communication with the remote computing device 112 over a network 114, such as the internet. The client computing device 118 can offload computational tasks to the remote computing device 112 in order to, for example, conserve computational resources at the client computing device 118 and/or leverage more robust resources available at the remote computing device 112. For instance, the remote computing device 112 can host the automated assistant 104, and the client computing device 118 can transmit inputs received at one or more assistant interfaces to the remote computing device 112. However, in some implementations, the automated assistant 104 can be hosted by the automated assistant 126 at the client computing device 118. In various implementations, all or less than all aspects of the automated assistant 104 can be implemented by the automated assistant 126 at the client computing device 118. In some of those implementations, aspects of the automated assistant 104 are implemented via the local automated assistant 126 of the client computing device 118 and interface with the remote computing device 112 that implements other aspects of the automated assistant 104. The remote computing device 112 can optionally serve a plurality of users and their associated assistant applications via multiple threads. In implementations where all or less than all aspects of the automated assistant 104 are implemented via the local automated assistant 126 of the client computing device 118, the local automated assistant 126 can be an application that is separate from an operating system of the client computing device 118 (e.g., installed "on top" of the operating system)—or can alternatively be implemented directly by the operating system of the client computing device 118 (e.g., considered an application of, but integral with, the operating system).

In some implementations, the remote computing device 112 can include a speech recognition engine 134 that can process audio data received at an assistant interface to determine text and/or other semantic representation(s) of a spoken utterance embodied in the audio data. The speech recognition engine 134 can utilize one or more speech recognition models 136 in determining text and/or other semantic representations of a spoken utterance embodied in audio data. As described herein, multiple speech recognition models 136 can be provided, and each can be for a corresponding language. For example, a first speech recognition model can be for English, a second speech recognition model can be for French, etc. Further, as described herein, which of multiple speech recognition models 136 is utilized in processing of audio data can be based on, for example, information contained in a user profile determined to correspond to the audio data being processed. For example, in some implementations a given user profile can be determined to correspond to audio data being processed based on matching voice features of the audio data to voice features associated with the user profile. Also, for example, in some implementations a given user profile can additionally or alternatively be determined to correspond to audio data being processed based on matching other sensor data (e.g., data from a camera and/or data from a fingerprint sensor), from sensor(s) of the client computing device 118, to corresponding data of the user profile. Continuing with the examples, if the user profile indicates that an English speech recognition model is significantly more likely to be utilized for the user than a French speech recognition model, the English speech recognition model can be utilized to process the audio data. The English speech recognition model can optionally be utilized in lieu of utilizing the French speech recognition model (or any other speech recognition model for a non-English language).

Additionally or alternatively, multiple speech recognition models 136 for multiple different languages can be utilized in processing of audio data to generate multiple candidate semantic representations (e.g., each corresponding to a different language). In some of those implementations, probability metrics (optionally dependent on current contextual parameter(s)) for the multiple different languages and/or measures for each of the multiple candidate semantic representations can be utilized to select only one of the candidate semantic representations as appropriate for generating and providing content that is responsive to the given spoken utterance.

In some implementations, the speech recognition models 136 each include one or machine learning models (e.g., neural network models) and/or statistical models for determining text (or other semantic representation) that corresponds to a spoken utterance embodied in audio data. In some implementations, the speech recognition engine 134 can utilize one of the speech recognition models 136 to determine phonemes, for a corresponding language, that are included in the audio data, and then generate text, for the corresponding language, based on the determined phonemes. In some implementations, speech recognition engine 134 receives an audio recording of voice input, e.g., in the form of digital audio data, and uses one or more models to convert the digital audio data into one or more text tokens. The model or models used by such functionality, which can collectively be considered a speech recognition model, generally model the relationship between an audio signal and phonetic units in a language, along with word sequences in the language. In some implementations, speech recognition models may include one or more of acoustic models, language models, pronunciation models, etc., as well as models combining functionality of one or more of such models. In some implementations, for example, speech recognition models may be implemented as finite state decoding graphs including a plurality of paths or pathways.

The automated assistant 104 can operate according to one or more language models simultaneously in order to be responsive to natural language inputs from the user 130 and/or provide responsive content to the user 130. For example, in some implementations, the automated assistant 104 can operate using an invocation phrase model simultaneously with using a speech recognition model that is associated with a particular language. In this way, the automated assistant can process audio data that embodies an invocation phrase and one or more commands provided in the particular language, and be responsive to both the invocation phrase and the one or more commands. The text, and/or semantic representations of text, converted from the audio data can parsed by a text parser engine 110 and made available to the automated assistant 104 as textual data or semantic data that can be used to generate and/or identify command phrases from the user 130 and/or a third party application.

In some implementations, a language model can include or refer to an acoustic model, a speech recognition model, an invocation phrase model, a voice-to-text model, a voice-to-semantic representation model, a text-to-semantic representation model, and/or any other model that can be used to translate a natural language input into data that can be processed by an application or a device. In some implementations, a language that the automated assistant 104 uses to communicate with the user 130 can be selected from one or more languages identified in a user profile. The automated assistant can access a user profile from one or more server user profiles 120 and/or one or more client user profiles 122. For example, when the user 130 is communicating with an automated assistant 126 at the client computing device 118, the user 130 can provide a spoken natural language input to an assistant interface 128 of the client computing device 118. The spoken natural language input can be converted into audio data, which can be processed by a client language model 124, such as an invocation phrase model for identifying whether the audio data embodies an invocation phrase for invoking the automated assistant 126. The client language model 124 can also provide a voice signature of the user 130. Based on the voice signature of the user 130, the automated assistant 126 can select a client user profile 122 that corresponds to the user 130. The client user profile 122 can identify one or more languages that the identified user 130 prefers to communicate in, depending on a context of an interaction, or characteristics of the interaction between the user 130 and the automated assistant 126.

In some implementations, the invocation phrase model can be employed at the client computing device 118 to determine whether the user 130 is intending to invoke the automated assistant 104. When the user provides a natural language input to the assistant interface 128, and the natural language input includes an invocation phrase for invoking the automated assistant 104, the client computing device 118 can cause the automated assistant 104 at the server device 102 to receive the natural language input and/or subsequent natural language inputs from the user 130. For instance, in response to determining that the user 130 is intending to invoke the automated assistant 104 at the client computing device 118, one or more communication channels can be established between the client computing device 118 and the server device 102. Thereafter, as the user continues to provide natural language inputs to the assistant interface 128, the natural language inputs will be converted into data that is then transmitted over the network 114 and processed by the server device 102. Thereafter, the automated assistant 104 can analyze the data to determine a user profile, that corresponds to the user, from one or more server user profiles 120 available at the server device 102. A speech recognition model 136 from the selected server user profile can be selected for communicating with the user 130. The selection of the speech recognition model 136 from the user profile can be based on a context of the user 130, one or more confidence scores or probabilities associated with one or more speech recognition model 136 identified by the user profile, and/or any other information that can be used to select a language.

In some implementations, each language identified by a user profile of the server user profiles 120 and/or the client user profiles 122 can be associated with a probability or a confidence score that can be static or dynamic. For example, a default language for a particular user can be identified by a user profile and include a correspondence to a confidence score that is higher than other confidence scores associated with other languages identified by the user profile. In some implementations, a language identified by a user profile can be associated with multiple confidence scores, and each confidence score of the multiple conference scores can be associated with a context. For example, the user profile can identify "home" as a location context for a particular language and a confidence score for the location context for the particular language. Because the user may prefer to communicate using the particular language at home over other languages, the user profile can identify a separate language and a separate confidence score associated with the separate language that is lower than the confidence score corresponding to the "home" location context. In other words, the user profile can indicate, using confidence scores and contextual data, that the user prefers to speak a particular language at home over other languages that are identified by the user profile.

In some implementations, a confidence score for a particular language and for a particular context can be based on assistant interaction data 106, which can be accessible to an automated assistant at the server device 102 or the client computing device 118. The assistant interaction data 106 can be generated based on historical interactions between one or more users and the automated assistant. Therefore, as the user interacts with the automated assistant using one or more different languages, the assistant interaction data 106 can reflect the one or more different languages that the user has communicated with. The confidence scores associated with the different languages, as identified by a user profile, can be dynamically updated based on how the assistant interaction data 106 changes over time. For example, contextual data identified by a user profile can identify a contact with which the user communicates with through the automated assistant by employing the automated assistant to compose messages to be sent to the contact. Initially, a user profile can identify a particular language that has a first confidence score when composing messages. However, if the user subsequently directs the automated assistant to compose a message for the contact in another language, a second confidence score, that is associated with the other language and a context of sending a message to the contact, can be increased above the first confidence score. In this way, the other language will become the default language according to the user profile, at least when the user is directing the automated assistant to compose a message for the contact. As a result, the user does not have to explicitly specify the other language when composing a message to the contact, thereby conserving computational resources that would otherwise be wasted on processing audio in a variety of different languages.

Figure 2:
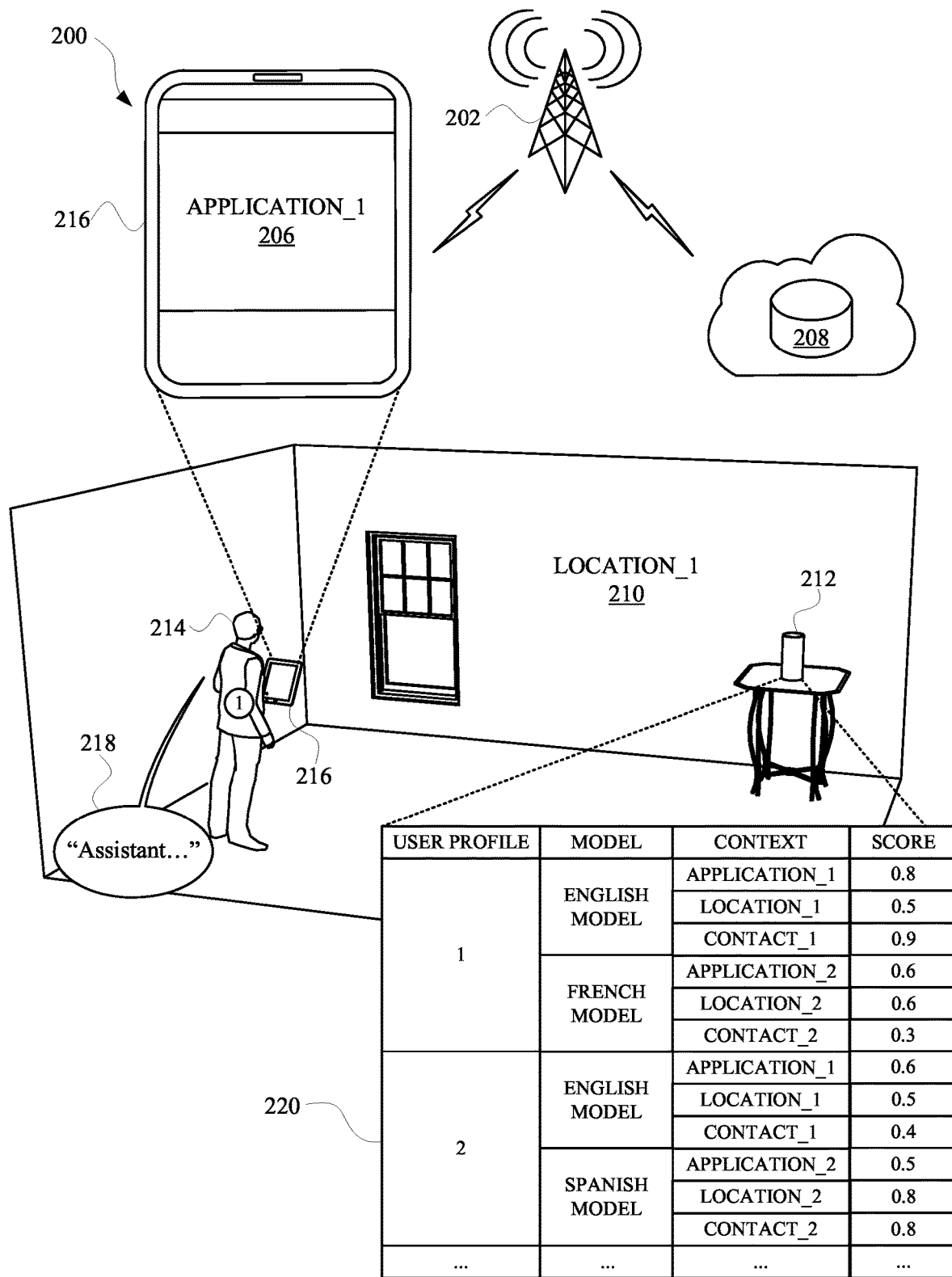
FIG. 2 illustrates a diagram of an example of a speech recognition model being selected based on a context in which a user is interacting with, or invoking, an automated assistant.

FIG. 2 illustrates a diagram 200 of an example of a language model being selected based on a context in which a user 214 is interacting with, or invoking, an automated assistant. Specifically, a user 214 can interact with an automated assistant through an assistant device 212. The assistant device 212 can store or access a table 220 that identifies one or more user profiles corresponding to different users that have or can interact with the automated assistant. For example, the table 220 can identify the user 214 (i.e., "1") and a separate user (i.e., "2"), each of which can be associated with different user profiles. A user profile can identify language preferences of a user, and the language preferences can be based on a context in which the user is interacting with the automated assistant. In some implementations, the language preferences can be adapted by the automated assistant overtime as the user interacts with the automated assistant (and/or other platforms) using different languages.

For example, the assistant device 212 can be located within a home of the user 214, which can be a residence of a separate user that also interacts with the automated assistant through the assistant device 212. The assistant device 212 can switch between user profiles according to the user that is employing the assistant device 212 to interact with the automated assistant. For instance, the user 214 can interact with the automated assistant through the assistant device 212 using English or French, while a separate user can interact with the automated assistant through the assistant device 212 using English or Spanish. In order for the assistant device 212 to understand a respective user and communicate with the respective user, the assistant device 212 can select a language model (e.g., a speech recognition model) for interpreting inputs from the user. The language model can be selected based on contents of the table 220 and/or a user profile associated with the respective user. Each language model can be associated with a score or probability, which quantifies a likelihood that the user is or will be communicating with the automated assistant according to a particular language.

In some implementations, the score or probability can be based on a context in which the user is interacting with the automated assistant or the assistant device 212. For example, the user 214 can provide a spoken natural language input 218, such as "Assistant," in order to invoke the automated assistant. The assistant device 212 can include an automated assistant interface that receives the spoken natural language input 218 for further processing at the assistant device 212. The assistant device 212 can employ a language model (e.g., an invocation phrase model) for determining a voice signature based on characteristics of the voice of the user 214. When the assistant device 212 has identified the voice signature of the user 214, the assistant device 212 can access a table 220 that identifies multiple different user profiles, corresponding to multiple different voice signatures, respectively, and a correspondence between the user profiles and different language models. The table 220 can also provide a correspondence between the language models and scores or probabilities, which can be used to determine whether to employ a particular language model. The scores can be based on a context in which the user 214 is invoking an automated assistant that is accessible through the assistant device 212.

As provided in FIG. 2, the user 214 can be operating an application 206 (i.e., APPLICATION 1) through a portable computing device 216, which provides basis for the assistant device 212 to select a particular language model. Alternatively, or additionally, the assistant device 212 can select a language model based on the user 214 being at a location 210. The table 220, or the user profile corresponding to the user 214, can provide a correspondence between a score for a language model and a context of the application and or the location. By identifying the context in which the user 214 is invoking the automated assistant, and comparing the contacts to the table 220, the assistant device 212 can determine the language model that has the highest score for the user 214. For instance, the automated assistant or the assistant device 212 can select the English model based on the user accessing the application 206 and being located at the location 210. Alternatively, if the user was located at LOCATION_2, identified by the table 220, but accessing APPLICATION_1, the automated assistant can select the English model because the score for APPLICATION_1 is greater than the score for LOCATION_2. However, if the user was located at LOCATION_1, but using APPLICATION_2 to communicate with CONTACT_2, the automated assistant can select the French model because the score for LOCATION_1 is less than the sum of the scores for APPLICATION_2 and CONTACT_2 (in other words: 0.5<(0.6+0.3)).

In some implementations, if the automated assistant selects a language model that was not intended by the user 214, and the user corrects the automated assistant by requesting a different language model be employed, the scores for each of the respective language models can be updated. For example, the language model that was initially selected can have its score decreased while the requested language model can have its score increased. If the requested language model (e.g., Swahili) is not identified by a user profile (e.g., the user profile "1" does not identify Swahili), the automated assistant can cause a request to be generated and transmitted over a network 202. The request can be received by a remote device 208, which can store multiple different language models that can be pushed to various devices upon request. For example, if the user 214 requests that a Swahili language model be employed, the automated assistant can request the Swahili language model from the remote device 208 and modify the user profile to identify the Swahili language model. Furthermore, the automated assistant can modify the user profile to identify a context in which the user requested the Swahili language model, and provide a score for the Swahili language model in the identified context (e.g., the user 214 being located at LOCATION_1).

In some implementations, the entries in the table 220 can correspond to same contexts but different scores for each model. For instance, APPLICATION_1 and APPLICATION_2 can be the same applications, LOCATION_1 and LOCATION_2 can be the same locations, and CONTACT_1 and CONTACT_2 can be the same contacts. Furthermore, each application, location, and/or contact can correspond to different scores, depending on the model being referenced. For example, if the user 213 is using the application at the location, the English model can be selected over the French model, since the total score for the English model would be 0.13 and the score for the French model would be 0.12. As another example, if the user 213 is at the location and communicating with the contacts, the English model would be selected over the French model, since the total score for the English model would be 0.14 and the score for the French model would be 0.9.

Figure 3:
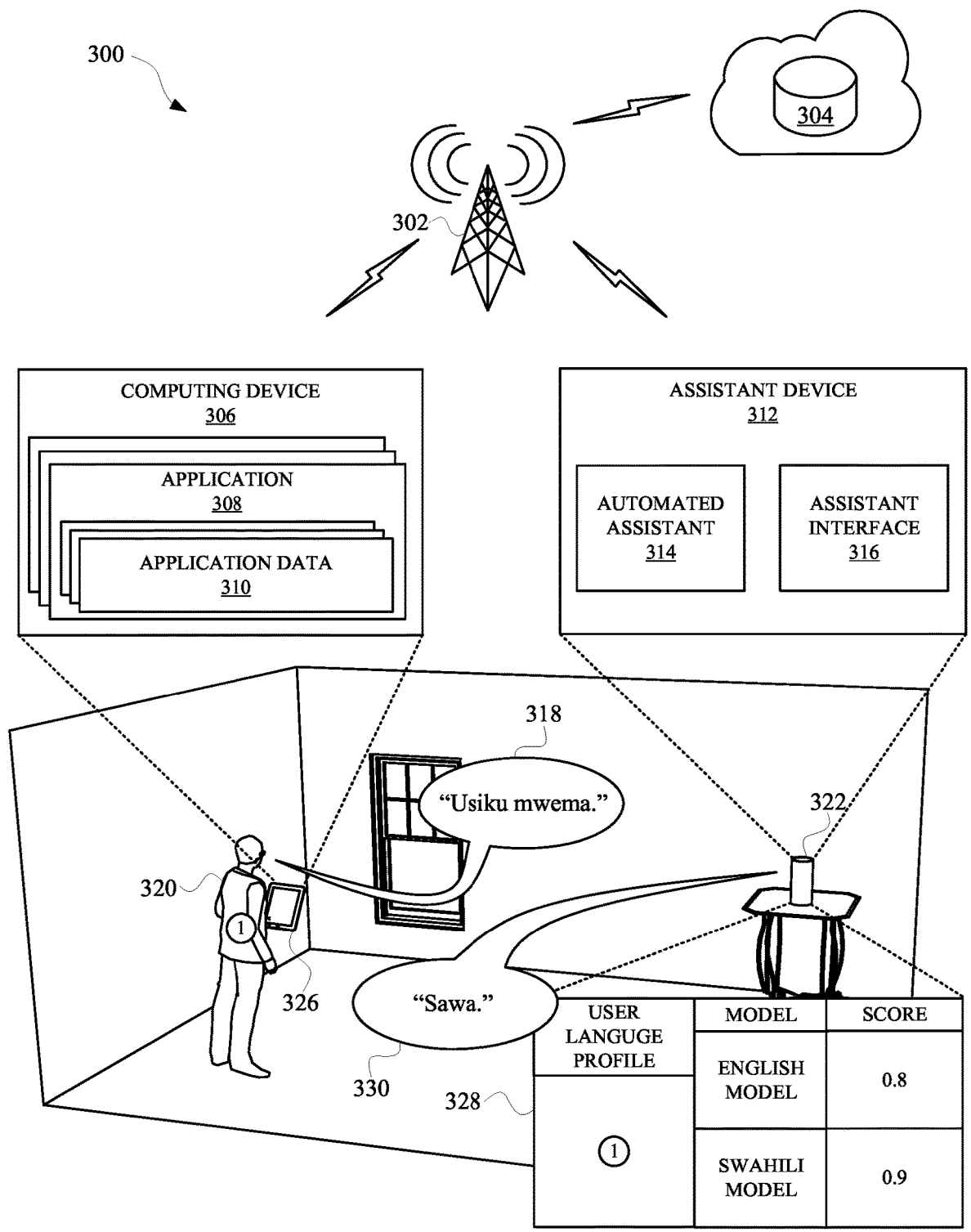
FIG. 3 illustrates a system for selecting a language in which to respond to a user, via an automated assistant, based on historical data that characterizes previous interactions between the user and one or more applications and/or computing devices.

FIG. 3 illustrates a system 300 for selecting a language in which to respond to a user 320, via an automated assistant 314, based on historical data (i.e., application data 310) that characterizes previous interactions between the user and one or more applications (e.g., application(s) 308) and/or computing devices. In this way, the automated assistant 314 can respond to the user 320 in a more suitable language when the user 320 is multi-lingual. Furthermore, this can allow the automated assistant 314 to select a more suitable language to process audio data, corresponding to spoken utterances 318 from the user 320, in order to preserve computational resources that might otherwise be expended processing the spoken utterance using a wrong language model.

For instance, the automated assistant 314 can be accessible via an automated assistant interface 316 of an assistant device 322, which can be a standalone speaker device that includes an audio system and/or a touch display panel for interfacing with the automated assistant 314. In some implementations, the automated assistant 314 can perform actions and/or routines that comprise one or more actions. An action can include executing a function at the assistant device 322, at a device that is remote from the assistant device 322, such as computing device 306 (e.g., a tablet device 326), and/or any other operation capable of being controlled by a computing device. For instance, the user 320 can provide the spoken utterance "Goodnight," in order to cause the automated assistant 314 to perform one or more actions that the user 320 typically likes being performed before going to bed. However, the user 320 may be bilingual and therefore provide the spoken utterance in different languages, such as Swahili, as indicated by the spoken utterance 318 illustrated in FIG. 3. The phrase "Usiku mwema" in Swahili can mean "Goodnight" in English. Therefore, when the user provides the spoken utterance 318, they may be intending to cause the automated assistant 314 to perform the action(s) associated with the spoken utterance "Goodnight."

In order to ensure that the user 320 is intending to invoke the automated assistant 314 to perform the "Goodnight" routine, and/or in order to provide a response in a preferred language of the user 320, the automated assistant 314 can select a language from multiple different languages. Specifically, the automated assistant 314 can select a language model for processing the spoken utterance 318 from the user 320, and the same or a different language model for responding to the user 320. For instance, in response to receiving the spoken utterance 318 at the automated assistant interface 316, the automated assistant 314 can cause at least a portion of the spoken utterance 318 to be processed at the assistant device 322 and/or a remote device (e.g., a server device). The portion of the spoken utterance 318 can be processed to determine a score for each language that is identified in a user language profile 328, that is stored at or otherwise accessible to the assistant device 322.

For instance, initially the user language profile 328, which can be available from a remote server 304 (e.g., remote relative to the assistant device 322) and/or the assistant device 322 can indicate that an "English model" is a default language model for operations involving the automated assistant 314, and/or is presently the only model for operations involving the automated assistant 314. The default language model can be employed by the assistant device 322 when there are no other indications, such as contextual data and/or application data, that another language model should be used. Optionally, the default language model can be employed by the assistant device 322 and/or any other device that the automated assistant 314 can access when a score corresponding to one or more other language models does not satisfy a particular language model threshold. Languages that are considered by the automated assistant 314 to be potentially useful for processing at least a portion of a spoken utterance and/or creating an output for responding to a spoken utterance, can be considered candidate languages. Additionally, or alternatively, languages or language models that have corresponding scores that satisfy a language threshold can be considered candidate languages. In some implementations, for example, a user can have an "English model" set as their default language for interacting with a computing device 306. However, the user 320 can interact with the automated assistant 314 in a way that causes a user language profile 328 to implicitly load a "Swahili model" as a potential alternative language for processing. Such implicitly loading can happen without the user 320 explicitly requesting the "Swahili model" to be loaded or added to their user language profile 328. Rather, one or more secondary and/or backup language models can be implicitly loaded based on data generated during interactions between the user 320 and the automated assistant 314 and/or the computing device 306.

A score (i.e., a ranking) can be determined using data that is associated with the user 320, the assistant device 322, contextual data, application data 310, any device (e.g., a remote server 304) and/or application, and/or any other apparatus or property associated with a spoken utterance. For instance, in response to receiving the spoken utterance 318, the automated assistant 314 can determine a first score and/or a ranking of one or more languages to use when responding to the user 320 and/or processing their spoken utterance 318. The score and/or ranking can reflect a probability that the spoken utterance 318 is in a particular language, and can prioritize at least one language (e.g., Swahili) over another language (e.g., English), depending on the particular spoken utterance 318.

In some implementations, a second score and/or a modified ranking can be generated by the automated assistant based on data that is accessible to the automated assistant. For instance, the automated assistant 314 can cause a second score and/or a modified ranking to be generated based on application data 310, which corresponds to at least one application 308 that is accessible via the computing device 306. The user language profile 328 can be based on information that is provided by the application 308 and/or is otherwise based on the application data 310. In some implementations, the user language profile 328 can be updated based on most recent activity between the user 320 and the application data 310 and/or the application 308. The application 308 can be, but is not limited to, an internet browser, mobile application, media streaming application, word processing application, messaging application, schedule application, IoT application, health application, social media application, and/or any other application that can be accessible via a computing device. Application data 310 can be provided by the application 308 for use by the automated assistant 314 with permission from the user. In some implementations, the application data 310 can indicate languages that the user prefers to interact with when operating their computing device 306. As one non-limiting example, the application data 310 can indicate that the user 320 provided an input to the application 308 using a first language (e.g., English), and selected content that was provided in a second language (e.g., Swahili). This can indicate that, although the user 320 can speak some English, they may prefer Swahili over English. As a result, the automated assistant 314 can acknowledge this preference in view of the application data 310 can cause the second score and/or modified ranking to prioritize Swahili over English (e.g., a "score" for English can be 0.8, and a "score" for Swahili can be higher at 0.9). Additionally, or alternatively, the automated assistant 314 can acknowledge this preference and use the preference to add a Swahili model as another option to a language profile that did not previously identify Swahili, and/or otherwise choose the Swahili model for processing content generated based on interactions between the user 320 and the automated assistant 314.

In some implementations, the second score and/or modified ranking can be based on application data from multiple different sources, such as multiple different devices and/or multiple different applications. When the second score and/or modified ranking has been determined, the automated assistant 314 can identify the language with the highest priority (i.e., a highest ranking and/or a highest score) and use that language when converting audio data, corresponding to the spoken utterance 318 to text, and/or generating a response to the spoken utterance 318. For instance, the assistant device 322 can convert the spoken utterance 318 to audio data that can be processed at the assistant device 322 and/or provided, over a network 302 (e.g., the internet), to the remote server 304. The audio data can then be processed using at least the prioritized language (e.g., Swahili) and converted into English text and/or English phonemes corresponding to an English translation of the spoken utterance 318. The resulting text and/or phonemes can then be used to identify a routine, action, and/or any other function being requested by the user 320 (e.g., the user 320 can be invoking a "Goodnight" routine, but in a language other than English).

In some implementations, when generating a response to the user 320, the automated assistant 314 can use a selected language that is based on scores and/or rankings of any languages accessible to the automated assistant 314. For instance, in response to receiving the spoken utterance 318, the automated assistant 314 can identify a particular action being requested by the user 320. The automated assistant 314 can confirm that the particular action has been identified by provided a response such as "Ok." However, because another language (e.g., Swahili) has been prioritized over English, the automated assistant 314 can use the prioritized language to provide the response the automated assistant 314 would otherwise respond with in a default language. For instance, the automated assistant 314 can cause an output response 330, such as "Sawa," to be provided from the assistant device 322 in order to indicate to the user 320 that their request to perform the "Goodnight" routine has been acknowledged.

In some implementations, a spoken utterance can converted into text according to any of the implementations discussed herein and provided into a text field that is being presented at a device and/or application. As a non-limiting example, the user 320 can provide a spoken utterance that is intended to be an input into a text field being presented at their tablet device 326. In response to receiving the spoken utterance, an automated assistant can determining a ranking of languages to use when processing audio data corresponding to the spoken utterance and/or providing a responsive output to the spoken utterance. The prioritized language resulting from the ranking can then be selected for processing the audio data that is based on the spoken utterance, and text resulting from processing at least a portion of the spoken utterance can be provided into the text field. In this way, a user 320 does not necessarily have to waste time manually switching between language operating modes of a computing device, but, rather, can rely on an automated assistant of the computing device to automatically switch languages according to a spoken utterance being provided and/or other application data.

In some implementations, scoring and/or ranking of languages, and/or employing a user language profile 328 for identifying one or more language models, as discussed herein, can be performed for interactions between the user and a computing device, without necessarily involving an automated assistant. For instance, such operations can be performed in order to select a language model for converting speech, received at a microphone, into text that is provided into a field of a user interface, such as when writing a text or an email. Additionally, or alternatively, such operations can be employed in order to generally assist a computing device with understanding, interpreting, and/or responding to a user, without necessarily involving the automated assistant. In this way, the user may not necessarily see how they are being interpreted by the computing device (e.g., they may not see their speech being converted to text) but, nonetheless, the computing device will interpret, understand, and/or respond to the user according to any of the operations and/or processes discussed herein.

Figure 4:
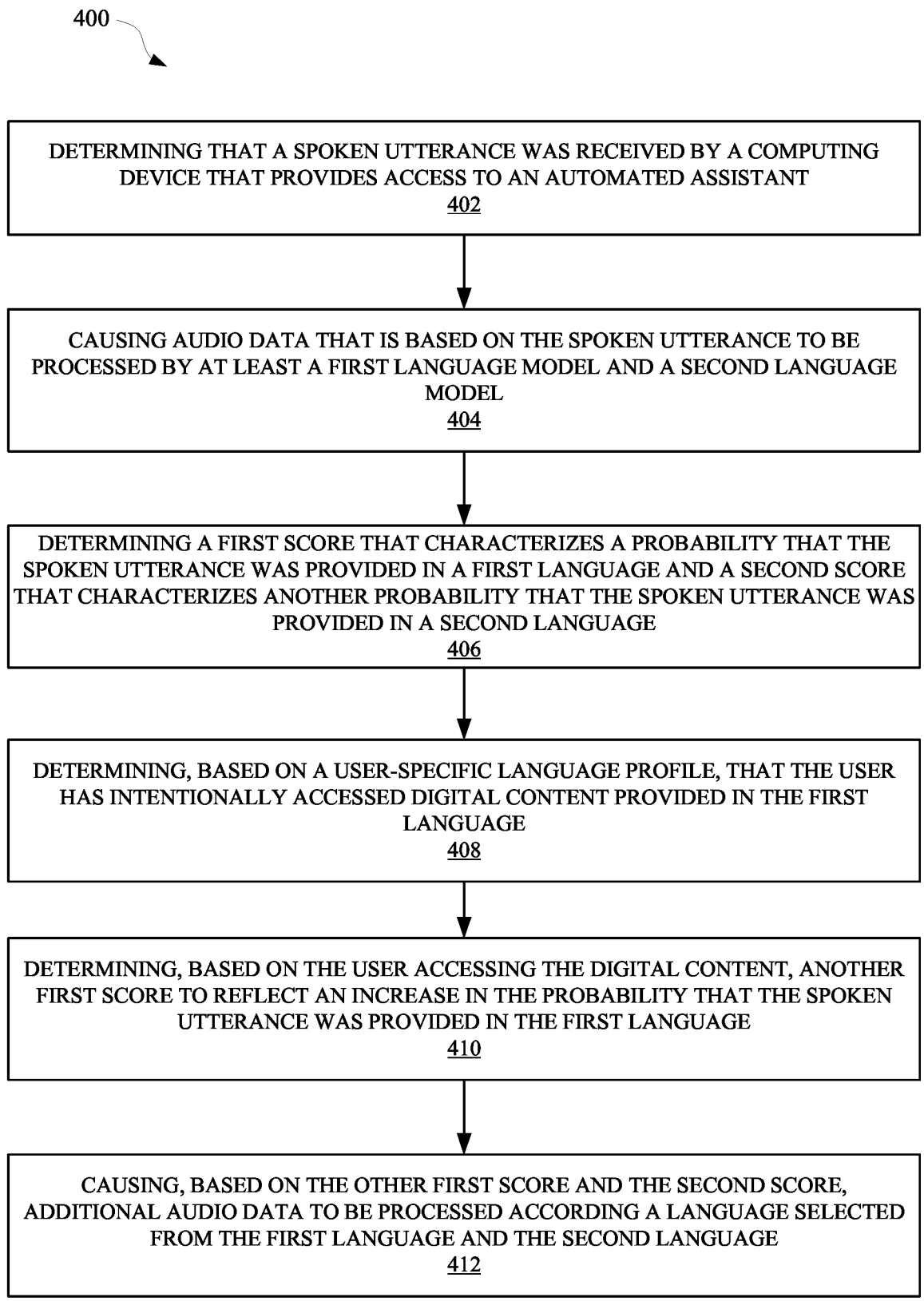
FIG. 4 illustrates a method for selecting a language, from multiple different languages, for use when responding to a spoken utterance from a user.

FIG. 4 illustrates a method 400 for selecting a language for use when responding to a spoken utterance from a user. The language can be selected from a group of multiple different languages already identified by a model, and/or selected from one or more languages that have not been identified by a model corresponding to a user. The method 400 can be performed by one or more computing devices or applications, and/or any other apparatus or module capable of processing a user input. The method 400 can include an operation 402 of determining that a spoken utterance was received by a computing device that provides access to an automated assistant. At least a portion of the spoken utterance can be received at the computing device and converted into audio data that can be further processed at the computing device and/or transmitted to another computing device for further processing.

The method 400 can further include an operation 404 of causing audio data that is based on the spoken utterance to be processed by at least a first language model and a second language model. The first language model and the second language model can be selected according to a user-specific preference of language models for interpreting spoken utterances from the user. The user-specific preference of language models can be explicitly selected by the user, and/or determined or inferred over time with direct or explicit selection by the user, as the user interacts with the automated assistant and/or one or more other applications. The user-specific preference can be adapted over time for the user, and can therefore be amended to identify more or less languages, according to how preferences of the user change over time. For instance, the user-specific preference can initially identify a default language for interacting with the user. However, over time, the user-specific preference can be modified based on whether the user communicates in the default language or another language with one or more different computing devices and/or applications. The other language can then be identified, at the user-specific preference, by the automated assistant when responding to spoken utterances from the user, subsequent to the user-specific preference being modified.

The method 400 can also include an operation 406 of determining a first score that characterizes a probability that the spoken utterance was provided in a first language and a second score that characterizes another probability that the spoken utterance was provided in a second language. Specifically, the scores can be based on data that characterizes previous user activity, which can include the user accessing content provided to the user in the first language and/or the second language. Such data can be used by the automated assistant and/or any other application or module for ranking and/or scoring one or more candidate languages for use when responding to a spoken utterance from the user, and/or amending the user-specific preference. Additionally, or alternatively, the data can be used for ranking and/or scoring one or more candidate languages for use when converting audio data to text that will provided to an input field or text field being presented at an interface of a computing device. In some implementations, the data can indicate that the user has provided an input to an application in a second language, and caused content to be provided by the application in the first language and the second language. Additionally, or alternatively, the data can also indicate that the user selected particular content that includes the first language and/or otherwise embodies the first language.

The method 400 can further include an operation 408 of determining, based on a user user-specific language profile, that the user has intentionally accessed digital content provided in the first language. In some implementations, the user-specific language profile can include an arrangement of scores in a table that identifies multiple different candidate languages. Therefore, a language that is prioritized over other languages in the table can be selected for use when responding and/or processing an input from the user. In some implementations, each score can characterize a likelihood that a corresponding language will be perceived by the user as the correct language in which to interpret and/or respond to the user. In some implementations, one or more scores can be used to select a language that is otherwise not identified by the table or not associated with a language model that has previously not been used to process inputs from the user, or outputs for the user.

The method 400 can also include an operation 410 of determining, based on the user accessing the digital content, another first score to reflect an increase in the probability that the spoken utterance was provided in the first language. In other words, although scores have been generated based on user-specific preferences, subsequent analysis can be performed in order to further develop the scores according to the activities and/or inferred preferences of the user.

The method 400 can further include an operation 412 of causing, based on the other first score and the second score, additional audio data to be processed according to a language selected from the first language and the second language. In some implementations, a portion of responsive audio data can be provided to the computing device in order to reduce latency that might otherwise be exhibited by waiting for the full audio data corresponding to the full responsive output to be generated. Therefore, each portion of the responsive audio data can be sent at a time from a remote server to the computing device. The portions can then be used by the automated assistant to audibly provide the responsive output to the user via the computing device. In some implementations, textual data can be generated at the remote server using the selected language model and provided to a backend service that incorporates the textual data into an input field of an application being used by the user of the computing device. In some implementations, when the first language is determined to be the selected language for interpreting and/or responding to the spoken utterance from the user, the computing device can query the remote server to determine whether the remote server includes a language model for the first language. If the remote server does not include the corresponding language model, the remote server and/or the computing device can redirect the automated assistant to a different remote server that includes the language model.

Figure 5:
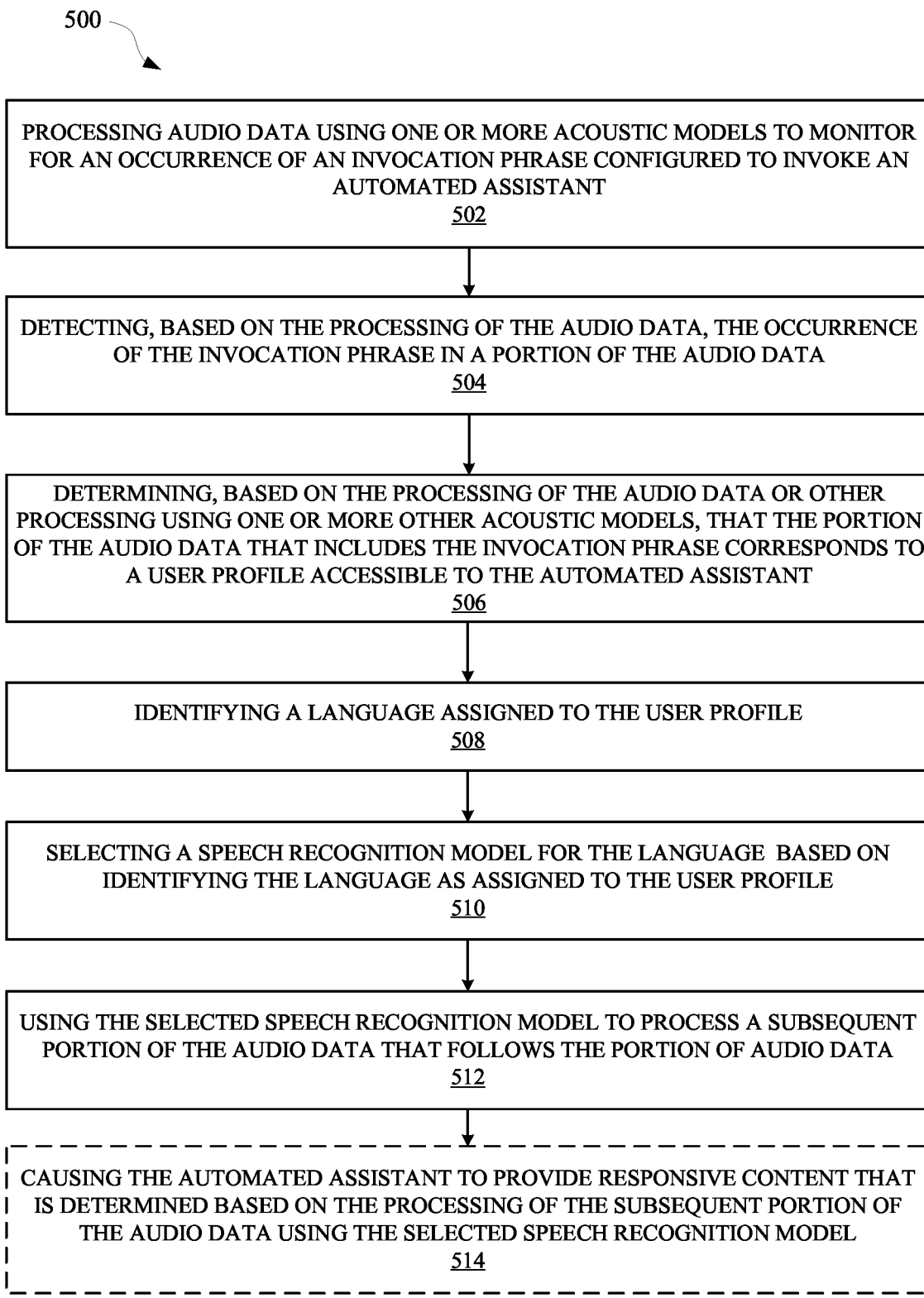
FIG. 5 illustrates a method for processing audio data according to a speech recognition model that is selected based on contents of a user profile.

FIG. 5 illustrates a method 500 for processing audio data according to a speech recognition model that is selected based on contents of a user profile. The method 500 can be performed by one or more computing devices or applications, and/or any other apparatus or module capable of processing a user input. The method 500 can include an operation 502 of processing audio data using one or more acoustic models to monitor for an occurrence of an invocation phrase configured to invoke an automated assistant. The audio data can be generated based on an audible input that is received at a client device that includes an automated assistant interface for interacting with the automated assistant. The automated assistant interface can be, for example, an audio subsystem of the client device and can therefore include one or more of a microphone, a speaker, and/or any other apparatus for transmitting audio related data.

In some implementations, the client device can store one or more acoustic models, and/or access one or more acoustic models over a network, such as the internet. The one or more acoustic models can include a first acoustic model, such as an invocation phrase acoustic model, for identifying the invocation phrase embodied in the audio data. The invocation phrase can identify the device, the automated assistant, and/or any other feature that can be associated with the automated assistant (e.g., "Assistant"). In some implementations, the first acoustic model can be agnostic to the language in which the invocation phrase is provided, but, rather the first acoustic model can process the audio data to identify pitch, tone, accents, intonation, and/or any other feature of speech that can be used to identify a phrase and/or a user. The first acoustic model can be arranged as an always active acoustic model in order that the automated assistant can be triggered at any time when the invocation phrase is received at the automated assistant interface. Simultaneously, in some implementations, one or more other acoustic models can be active, at least according to a user profile that is stored at the client device or otherwise accessible to the automated assisting.

The method 500 can further include an operation 504 of detecting, based on the processing of the audio data, the occurrence of the invocation phrase in a portion of the audio data. For example, when the invocation phrase is, "Assistant," the first acoustic model can receive the portion of audio data and output either a semantic representation of the word "assistant," or text corresponding to the word "assistant." The automated assistant can then compare the semantic representation, or the text, to one or more stored representations of the invocation phrase in order to determine whether the user is intending to invoke the automated assistant.

The method 500 can also include an operation 506 of determining that the portion of the audio data that includes the invocation phrase corresponds to a user profile accessible to the automated assistant. This determination can be performed based on the processing of the audio data using the one or more acoustic models, or other processing using one or more other acoustic models. For example, in some implementations, the first acoustic model can receive the portion of audio data as the input and provide an output that indicates that the user is intending to invoke the automated assistant. The first acoustic model can also provide an output that identifies the user that provided the audio input corresponding to the audio data. Specifically, the first acoustic model can operate to distinguish how different users say a particular invocation phrase. As an example, a first user may provide an invocation phrase at a pitch that is higher than a second user provides the same invocation phrase, therefore the first acoustic model can distinguish the first user from the second user by analyzing a level of pitch exhibited by the audio data. In some implementations, the automated assistant can access a table of voice signatures that identifies voice characteristics for each user that accesses the automated assistant. In this way, the automated assistant can use one or more acoustic models to characterize voice characteristics and identify a user profile of a user based on a degree of correspondence between an input from the user and the voice characteristics stored in association with the user profile in the table of voice signatures.

The user profile can identify one or more languages corresponding to one or more speech recognition models for processing natural language inputs from the user whose language preferences are identified by the user profile. The user profile can identify contexts in which the user prefers particular languages, probabilities or confidence scores associated with the particular languages, availability of speech recognition models corresponding to the languages, and/or any other data that can be used to identify language preferences of the user. The contexts identified by the user profile can include applications, locations, devices, contacts, times, and/or any other data that can characterize a context in which a user communicates using a particular language. In this way, a current context of the user that provided the audio input corresponding to the audio data can be compared to contextual data identified in the user profile of the user in order to identify a language that the user prefers to communicate given the current context. For example, if the user is at home and the user profile indicates that the user prefers to use Spanish when at home, the automated assistant can select Spanish as a preferred of language when the user invokes the automated assistant at home.

The method 500 can also include an operation 508 of identifying a language assigned to the user profile. The user profile can include multiple different languages that are assigned to the user profile, and the language identified at operation 508 can depend on a confidence score associated with the language in the user profile, contextual data corresponding to the language in the user profile, and/or any other data identified in the user profile suitable for processing when identifying the language. In some implementations, identifying the language assigned to the user profile can include flagging the language as the active language for the automated assistant at the time the user provides the invocation phrase or subsequently thereafter.

The method 500 can further include an operation 510 of selecting a speech recognition model for the language based on identifying the language as assigned to the user profile. The speech recognition model can be selected from one or more candidate speech recognition models. In this way, the automated assistant can switch between speech recognition models in order to ensure that the automated assistant can interact with the user despite the user communicating in multiple different languages. In some implementations, the user profile can provide a correspondence between a language identified in the user profile and a speech recognition model. In this way, when the automated assistant identifies the language preferred by the user, the automated assistant will be able to also identify the speech recognition model corresponding to the preferred language.

The method 500 can also include an operation 512 of using the selected speech recognition model to process a subsequent portion of the audio data that follows the portion of audio data. In other words, a client device that includes the automated assistant at which the audio input is received, can store a snippet of audio data that embodies the invocation phrase as well as one or more other commands provided by the user. The automated assistant can cause a portion of the audio data to be processed by the first acoustic model to determine whether the user provided the invocation phrase. Any portion of the audio data that does not embody the invocation phrase can be processed by the speech recognition model. In this way, the user does not need to repeat any commands after this speech recognition model has been selected, but rather can rely on the automated assistant to adapt to variations in language that can occur as the user is interacting with the automated assistant.

The method 500 can optionally include an operation 514 of causing the automated assistant to provide responsive content that is determined or generated based on the processing of the subsequent portion of the audio data using the selected speech recognition model. The responsive content can be any output capable of being provided by a computing device. For example, the responsive content can be a natural language output generated by a speech generation model corresponding to the language identified at operation 508. Therefore, the natural language output can be an audio output, a video output, and/or any other output that can be characterized as a natural language output. When the subsequent portion of audio data includes a query from the user, the responsive content can be an answer to the query that is provided in the language identified at operation 508.

Figure 6:
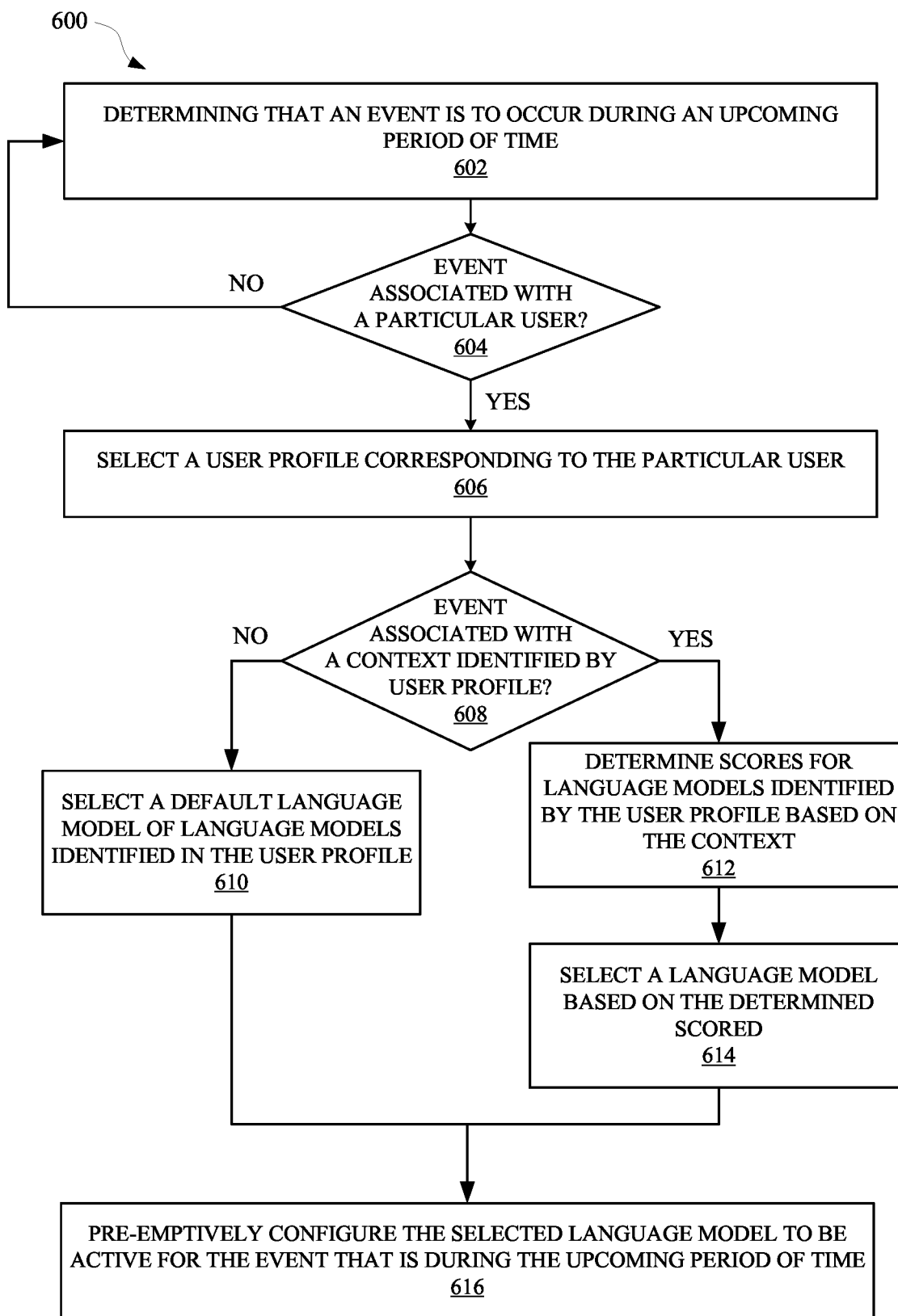
FIG. 6 illustrates a method for scheduling a language model to be pre-emptively activated according to contextual data accessible to an automated assistant.

FIG. 6 illustrates a method 600 for scheduling a language model to be pre-emptively activated according to contextual data accessible to an automated assistant. The method can be performed by one or more computing devices, applications, and/or any other apparatus or module capable of interacting with an automated assistant. The method 600 can include an operation 602 of determining that an event is to occur during an upcoming period of time. The event can be described by a stored calendar event or other data that characterizes the event and sets forth the period of time at which the event will occur. An automated assistant can determine that the event is going to occur at the upcoming period of time by accessing account data associated with a particular user or group of users. Alternatively, the automated assistant can be at least partially hosted at a device that includes a memory that stores data corresponding to multiple different events that are associated with multiple different users. In some implementations, the event can be identified over a network, such as the internet, and can be associated with publicly available data that is associated with one or more different users. For example, the event can be associated with an upcoming public festival or public holiday that can be associated with a particular language.

The method 600 can further include an operation 604 of determining whether the event is associated with a particular user. The determination can be based on a comparison between event-related data and user-related data that are accessible to the automated assistant. For example, an event can be associated with the user when the event is described by a calendar entry and includes the user as an attendee. Furthermore, an event can be associated with a particular user when an account associated with the user includes information that is associated with the event. Moreover, the event can be associated with a particular user when historical interaction data between the user and an automated assistant identifies the event, or otherwise describes information associated with the event. For example, if a particular user has requested that the automated assistant order tickets to a particular destination that is also the location of the event, the event can be associated with the particular user.

When the event is not associated with a particular user, the method 600 can refer back to operation 602 of monitoring whether an upcoming event is to occur. Otherwise, when the event is associated with the particular user, the method 600 can proceed to operation 606 of selecting a user profile corresponding to the particular user. The user profile can be identified in an index or table that lists one or more user profiles and provides a correspondence between the user profiles and one or more different users. For example, a computing device that at least partially hosts an automated assistant can store one or more user profiles, which can designate particular language models to use for communicating with or interpreting inputs from a particular user. Therefore, because the event is associated with a particular user, a user profile can be selected in order to identify a suitable language model to activate pre-emptively for the upcoming event.

The method 600 can also include an operation 608 of determining whether the event is associated with a context identified by the selected user profile. If the event is not associated with a context identified by the user profile, the method 600 can proceed to an operation 610 of selecting a default language model of language models identified in the user profile. For example, the selected user profile can identify contexts such as a location, a contact or person associated with the event, an application or a device associated with the event, a time for the event, and/or any other information that can identify a context in which an event can occur.

When the event is associated with a context identified by the user profile, the method 400 can proceed to an operation 612 of determining one or more scores for one or more language models identified by the user profile based on the context. For example, the event can be associated with a location, and the user profile can identify: a first score for a first language model and the location, and a second score for a second language model and the location. If the first score is greater than the second score, the first language model can be selected for pre-emptively activating for the upcoming event.

When the scores are determined for the language models identified by the user profile, then the method 600 can proceed to an operation 604 of selecting a language model based on the determined score. In some implementations, when two or more scores are the same or substantially similar, additional context can be considered in order to further distinguish the scores and select a suitable language model. For example, if the event is associated with contacts that the user has previously communicated with using a particular language, the user profile can identify one or more of the contacts in order to determine additional scores to consider. The additional scores can be combined with the previously considered scores, and a language model associated with the highest score can be selected for pre-emptively activating.

When a particular language model has been selected user profile, the method 600 can proceed to an operation 616 of preemptively configuring the selected language model to be active for the event that is during the upcoming period of time. In this way, when the event begins, or the period of time is the present time, the selected language model will be active. This can be useful when the event is located in area with limited network connectivity, as the language model would have already been downloaded to the device of the user before the event.

Figure 7:
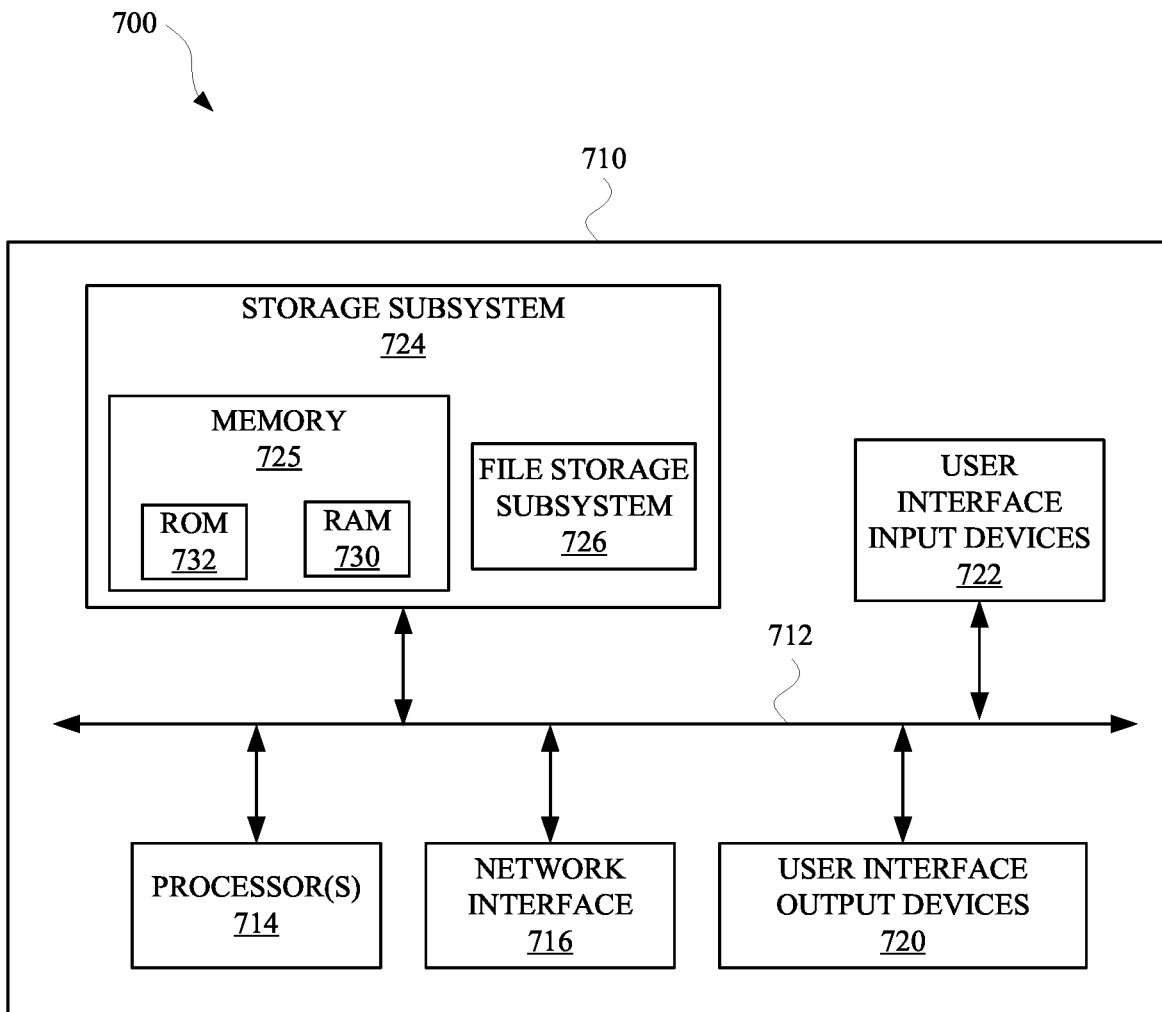
FIG. 7 is a block diagram of an example computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 400, 500, 600, and/or to implement one or more of server device 102, client computing device 118, portable computing device 132, assistant device 212, assistant device 322, automated assistant 314, application 308, computing device 306, and/or any other device or operation discussed herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
   determining that a user has interacted with one or more applications when the one or more applications were providing natural language content in a first language, wherein the first language is different from a second language that is a user-specific speech processing language defined in user-specific language profile that corresponds to the user;

causing, based on determining that the user has interacted with the one or more applications, the user-specific language profile to be modified to also reference the first language;

receiving, subsequent to the user-specific language profile being modified to also reference the first language, audio data corresponding to a spoken utterance received at an automated assistant interface of a computing device;

responsive to receiving the audio data corresponding to the first spoken utterance, and based on the first language being included in the user-specific language profile and the second language being the user-specific speech processing language in the user-specific language profile, determining:
- a first score that characterizes a probability that the spoken utterance was provided by the user in the first language, and
- a second score that characterizes another probability that the spoken utterance was provided by the user in the second language;

selecting, based on at least the first score and the second score, the first language over the second language; and in response to selecting the first language, using first language speech recognition results, from performing speech recognition for the first language based on the audio data, in generating a response to the spoken utterance.

2. The method of claim 1, wherein determining the first score is based on output that is generated in performing speech recognition for the first language based on the audio data.

3. The method of claim 2, wherein determining the second score is based on output that is generated in performing speech recognition for the second language based on the audio data.

4. The method of claim 3, wherein determining the first score is further based on a first probability metric that is assigned, in the user-specific language profile, to the first language.

5. The method of claim 4, wherein determining the first score is further based on a second probability metric that is assigned, in the user-specific language profile, to the second language.

6. The method of claim 1, wherein determining the first score is based on a first probability metric that is assigned, in the user-specific language profile, to the first language.

7. The method of claim 6, further comprising utilizing the first probability, in determining the first score, in response to the first probability being associated with a location and the computing device having the location when the audio data, corresponding to the spoken utterance, is received.

8. The method of claim 6, wherein determining the first score is further based on a second probability metric that is assigned, in the user-specific language profile, to the second language.

9. The method of claim 1, further comprising:
causing the response to be rendered at the computing device, wherein the response is provided in the first language in response to selecting the first language.

10. The method of claim 1, wherein the one or more applications include an email application and wherein determining that the user has interacted with the one or more application when the one or more application were providing natural language content in the first language comprises determining that the email application includes emails written in the first language.

11. A system comprising:
one or more processors; and
memory configured to store instructions that, when executed by the one or more processors cause the one or more processors to perform operations that include:
determining that a user has interacted with natural language content that is in a first language, wherein the first language is different from a second language that is a user-specific speech processing language defined in user-specific language profile that corresponds to the user;

causing, based on determining that the user has interacted with the natural language content in the first language, the user-specific language profile to be modified to also reference the first language;

receiving, subsequent to the user-specific language profile being modified to also reference the first language, audio data corresponding to a spoken utterance received at an automated assistant interface of a computing device;

responsive to receiving the audio data corresponding to the first spoken utterance, and based on the first language being included in the user-specific language profile and the second language being the user-specific speech processing language in the user-specific language profile, determining:
- a first score that characterizes a probability that the spoken utterance was provided by the user in the first language, and
- a second score that characterizes another probability that the spoken utterance was provided by the user in the second language;

selecting, based on at least the first score and the second score, the first language over the second language; and in response to selecting the first language, using first language speech recognition results, from performing speech recognition for the first language based on the audio data, in generating a response to the spoken utterance.

12. The system of claim 11, wherein determining the first score is based on output that is generated in performing speech recognition for the first language based on the audio data.

13. The system of claim 12, wherein determining the second score is based on output that is generated in performing speech recognition for the second language based on the audio data.

14. The system of claim 13, wherein determining the first score is further based on a first probability metric that is assigned, in the user-specific language profile, to the first language.

15. The system of claim 14, wherein determining the first score is further based on a second probability metric that is assigned, in the user-specific language profile, to the second language.

16. The system of claim 11, wherein determining the first score is based on a first probability metric that is assigned, in the user-specific language profile, to the first language.

17. The system of claim 16, wherein the operations further include utilizing the first probability, in determining the first score, in response to the first probability being associated with a location and the computing device having the location when the audio data, corresponding to the spoken utterance, is received.

18. The system of claim 16, wherein determining the first score is further based on a second probability metric that is assigned, in the user-specific language profile, to the second language.

19. The system of claim 11, wherein the operations further include:
    causing the response to be rendered at the computing device, wherein the response is provided in the first language in response to selecting the first language.

20. The system of claim 11, wherein the one or more applications include an email application and wherein determining that the user has interacted with the one or more application when the one or more application were providing natural language content in the first language comprises determining that the email application includes emails written in the first language.

\* \* \* \* \*